United States Patent [19]
Lichtenstein

[11] Patent Number: 5,428,417
[45] Date of Patent: Jun. 27, 1995

[54] VISUAL LECTURE AID

[76] Inventor: Bernard Lichtenstein, 970 Chestnut Hill, Bethel, Conn. 06801

[21] Appl. No.: 100,380

[22] Filed: Aug. 2, 1993

[51] Int. Cl.$^6$ .............................................. G03B 21/00
[52] U.S. Cl. ................................................... 353/122
[58] Field of Search ...................... 353/94, 21, 29, 42, 353/122; 340/705, 706; 434/365

[56] References Cited

U.S. PATENT DOCUMENTS

| | | | |
|---|---|---|---|
| 4,291,954 | 9/1981 | Wilson | 353/42 |
| 4,568,161 | 2/1986 | DiGiaufilippo et al. | 353/94 |
| 4,812,034 | 3/1989 | Mochizuki et al. | 353/122 |
| 4,846,694 | 7/1989 | Erhardt | 353/42 |
| 4,944,578 | 7/1990 | Denison | 353/122 |
| 5,101,197 | 3/1992 | Hix et al. | 353/122 |

FOREIGN PATENT DOCUMENTS 0676756  2/1991  Switzerland ........................ 353/94

Primary Examiner—William A. Cuchlinski, Jr.
Assistant Examiner—William C. Dowling

[57] ABSTRACT

An overlay projection apparatus for aiding in the communication of graphic presentations to large audiences by enabling the on-screen writing of overlay icons, highlighting bars and alpha-numeric labels as selected by the presenter. Brightness and color control of overlay highlighting graphics provide audience visual comfort over a wide variation of projected underlay graphic and ambient light conditions. Digital formation of overlay graphics by presenter/lecturer touch control command from a remote video panel also enables total storage and recall of multiple frames of complex overlay graphics with matching underlay graphics for reemphasis or for question and answer sessions between the lecturer and audience.

20 Claims, 11 Drawing Sheets

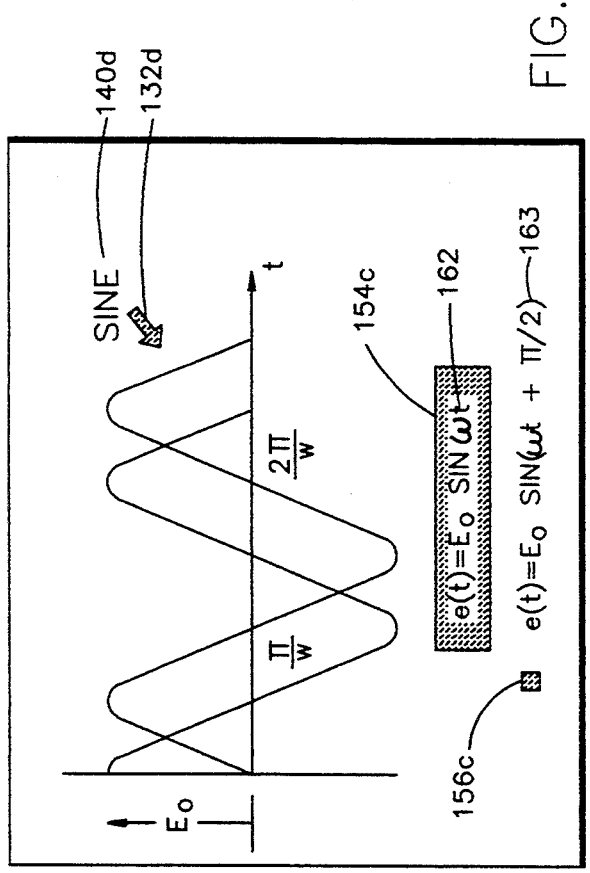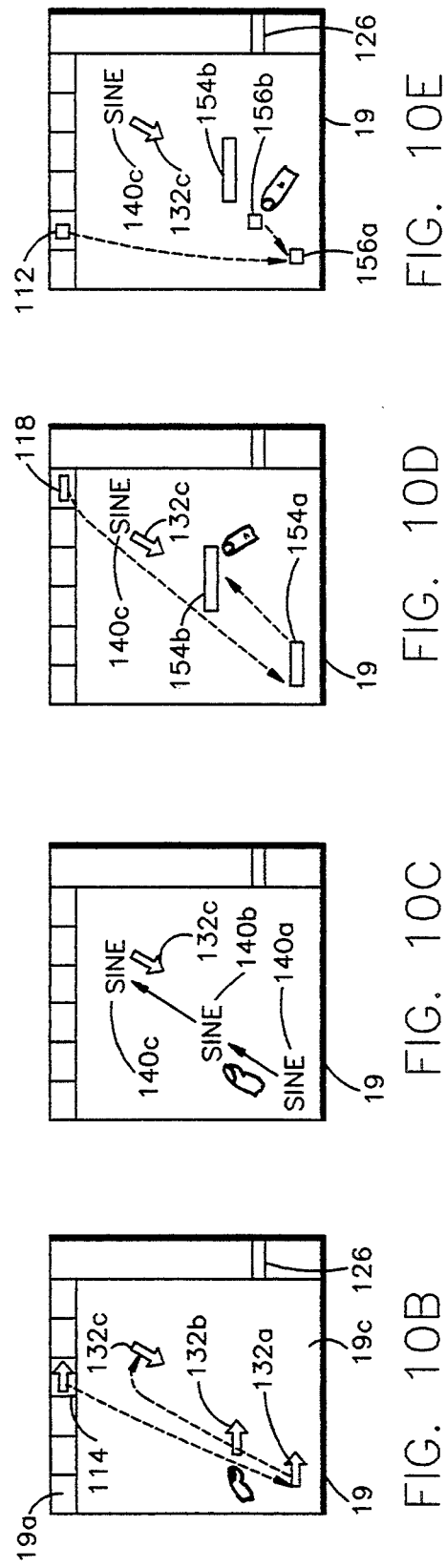

VISUAL LECTURE AID

BACKGROUND OF THE INVENTION (1) Field of the Invention

This invention relates to a new apparatus for aiding in the communication of information to an audience when projected graphics are used by providing the lecturer with a simply controlled means for focusing attention to and enhancing the description of the significant portions of the projected graphics.

(2) Description of Prior Art

In the process of communicating information and concepts to an audience with the aid of projected graphics, a lecturer may wish to highlight certain portions of a projected image and will usually do so with the aid of a pointing stick or a projected arrow shaped cutout or, a ruby red laser beam. The use of the pointing stick is limited to relatively small and reachable screens and requires the lecturer to leave the lectern. Additionally, the pointing stick requires the lecturer to get close to the screen which usually results in obscuring the view of the projected image to some part of the audience. Another disadvantage of the pointing stick is that it forces the lecturer closer to the screen which can be visually uncomfortable for elderly speakers.

The second common method used by the lecturer to highlight the talk is the hand held arrow projector which is better than the pointing stick since it can be used from the lectern. However, it is very difficult to hold the arrow projector steady for extended periods of discussion, thus creating distractions to the audience from the subject matter of the lecture. All hand held, light projecting pointers suffer from hand tremor distraction problems including the ruby red laser pointer. Laser beam pointers also represent a serious health hazard if accidentally focused on the human eye. Manufacturers of these devices are careful to provide hazard warning labels to users but the potential for eye damage remains a serious limitation of its use.

None of the aforementioned devices include means for freeing the lecturer from support of the pointing or highlighting device, freezing the position of the pointing icon or, providing multiple pointing icons or multiple line highlighting overstrike as further aid to the lecturer in conveying ideas and concepts to the audience. It is readily understood that when a lecturer centers discussion around projected graphics of any complexity, an ability to utilize multiple pointing and highlighting techniques is a distinct advantage in conveying the full subject matter of the discussion. It should also be recognized that freeing the lecturer from support of the pointing or highlighting tool, as this invention does, enables better communication with the audience by allowing the lecturer to maintain audience eye contact otherwise lost by using the manually supported pointing means.

Patents have been issued for concepts of devices which generate a single highlighting point of light as controlled by the lecturer or synchronized with a recorded message such as described in U.S. Pat. No. 4,146,314 issued to S. Wilson in 1979 and U.S. Pat. No. 4,291,314 issued to S. Wilson in 1981. Although the Wilson patents overcome many of the sighted weaknesses of the hand held pointers, the art so described by these patents is not capable of full multigraphics overlay as is the apparatus of this invention. Also, the apparatus described by the Wilson patent is electromechanical wherein positional speed, repeatability and stability of the pointing spot are subject to the accuracy and repeatability limitations of motors, shaft encoders and servo-system errors, whereas none of these weaknesses and limitations apply to the apparatus of this invention since it does not requires servosystems to control the location of projected overlay graphic elements. Additionally, since the apparatus of the Wilson patent is electromechanical, it is subject to the generally poor reliability limits of complex mechanical mechanisms as compared to the significantly better reliability of properly designed solid state devices which are the major part of the apparatus of this invention.

OBJECTS OF THE INVENTION

It is accordingly an object of this invention to provide new and improved apparatus for highlighting projected graphics with a simply controlled multigraphic overlay.

Another object of this invention is to make the overlay bright and readable without obscuring the primary graphic display.

Another object of this invention is to make the projected overlay of complex graphics simply controllable by the lecturer and to free the lecturer from the controller once the highlighting graphics have been positioned.

Another object of this invention is to improve the apparatus of overlay creation and projection by adding full storage and simple retrieval of all overlay graphics properly matched to its projected underlay graphics.

A further object of this invention is to provide a means within the overlay projection apparatus for rapid and simple expansion and updating of the stored graphics library from small peripheral devices such as portable computer terminals.

SUMMARY OF THE INVENTION

This invention is intended to overcome the limitations of the prior art and to add new capabilities and means for those people communicating ideas and information to audiences by visual means. Thus, a lecturer utilizing fixed or real time projected images on a large screen to help communicate information often wishes to efficiently highlight or otherwise emphasize and identify multiple parts of the total set of ideas portrayed by the projected image. Briefly stated, in accordance with this invention, the aforementioned objective is obtained by the apparatus of this invention which includes the essential modules of a high intensity solid state overlay projection device, simply controlled by the lecturer from a small display-type touch panel. The overlay projector module provides the lecturer with the capability of projecting controlled graphic overlay images consisting of multiple pointing icons, highlighting overstrikes and alphanumeric labels. The display-type touch panel provides the lecturer with visible selective control of various highlighting graphics including their spatial positioning, orientation, positional freeze, deletion, and editing, brightness adjustment, and projected color selection. Additionally, the touch panel provides the lecturer with the ability of selection of the underlay slide or video projected underlay graphic. The overlay projection apparatus creates the overlay image from a rectangular planar array of independently controlled very bright points of light. As will be described by this invention, the method for generating the array of controlled very bright points or pixels of points of light is by means of an optically robust planar rectangular array of light modulators working with a high intensity light source in combination with adjustable optics for projecting and adjusting the full array projections to the size of the underlay projected image and, with suitable electronic means for controlling the instantaneous state of all of the pixels of the Light Modulating Array (LMA) and, suitable means for linear light output control and, suitable means for projected color selection.

Analysis and experiment have shown that in order to provide a pleasing overlay image at reasonable overlay projector size and cost, the operating characteristics required of the LMA, in combination with its optics and light source will have to include the following features:

1. An integrated Dynamic Range of at least 150 to 1.
2. A minimum of approximately 256 by 256 elements.
3. A pixel switching speed equivalent to at least 20 frames per second.
4. LMA light transmissivity of at least 20%.
5. Stable LMA operation at optical densities of the order of 5 Watts per square centimeter.
6. A projected light illuminance at least 1.25 times greater than the maximum illuminance of the underlay image measured at the audience viewing screen.
7. Projected brightness adjustability over a 4 to 1 range.

The preferred embodiment of this invention includes a LMA fabricated from a Ferroelectric liquid crystal body with appropriate transparent conductors which define the pixels and which also includes light masks over uncontrolled, non-pixel, areas.

The LMA of this invention includes light masking to minimize light leakage over its uncontrolled areas in order to meet the first of the aforementioned operating requirement. The combination of operating requirements 3–5 are unique to the state of the art of Ferroelectric liquid crystal array technology. Other types of liquid crystal light modulators are not as suitable for use in the application of an overlay projector since for example the Nematic liquid crystal is more temperature sensitive and becomes unstable at the optical power densities required for this application while the magnetooptic light modulator suffers from extremely poor transmissivity.

The sixth operating requirement is achieved with the utilization of a high brightness compact light source such as the high pressure metal halide type, working in conjunction with low absorption optics.

The seventh operational requirement provides a means for enabling a match of dark levels between the overlay and underlay projectors while assuring good overlay contrast with respect to the underlay high brightness levels. It is readily understood that the maximum brightness levels of the various kinds of underlay projectors, such as photographic slide projectors, will vary as a function of both their intrinsic light source and distance to the projection screen. That is, the maximum illuminance provided by the underlay projector will decrease as the square of the distance to the viewing screen. The dark level will also vary with underlay projector dynamic range and ambient light. It can be readily understood that an overlay projector dark level in excess of the underlay dark level would disturb the content of the underlay image and is therefore undesirable. Assuring operational requirement 1, an illuminance dynamic range of about 150 to 1 and operational requirement 7, an adjustable illuminance control range of 4 to 1, assures achievement of matching dark levels and good overlay graphics contrast to underlay graphic light levels for a wide variation of underlay image projectors and conditions of use.

The overlay projector module of this invention will utilize a fixed high intensity light source and provide control of output luminance by utilizing a pair of light polorizing plates which are part of the LMA assembly. Light transmission will be controlled over approximately a 4 to 1 range by rotating the output plate over approximately 67 degrees. This can be seen mathematically from the expression for light transmission through a pair of polorizing plates shown in equation 1, $$T = K0 \cos^2\theta + K90 \sin^2\theta \qquad 1.$$

where:
T = light transmittance
K0 = Maximum light transmission, (approx. 0.42)
K90 = Minimum light transmission, (approx. 0.02)
$\theta$ = relative angle of plate rotation Thus, the overlay projector of this invention will include the components of a special Light Modulator Array (LMA), illuminated by a high intensity light source with appropriate optics and light transmission control, working in conjunction with driving electronics to sequentially control the on-off state of each pixel of the LMA in a raster scan format and, whose video input data is further defined by inputs from a remote control touchpanel.

In the preferred embodiment of this invention, the remote control device is a microprocessor controlled display touchpanel with internal digital memory of sufficient capacity for storing alphanumeric labels and graphic Icons such as arrows, circles, squares etc. which are used for pointing purposes. Additionally, the touchpanel itself is a video electroluminescent type which operates by recognizing the x-y coordinates of the point of touch via the interruption of infra-red light beams from sources placed around the perimeter of the video panel. The pointing coordinates thus recognized are converted to a digital word which now is used to move any icon or other graphic displayed on the touchpanel or to respond to a command function, depending on the mode of the displayed touchpanel page.

When the touchpanel is first turned on, it displays menu type information to enable simple selection of graphic icons or predetermined labels for downloading to the projection apparatus. When, for example, a specific icon is selected by touch, it is downloaded to the projection array buffer memory which controls the LMA and projects the selected icon to one of the four corners of the screen as a starting position. A portion of the rectangular touch panel then serves the lecturer as a scaled down version of the projection screen and simplifies the positioning, for example, of an icon to any portion of the screen by touching a finger or small pointer to that icon and moving it on the control panel while observing its movement on the projection screen as feedback. Similarly, the lecturer can call up other icons to further enhance the discussion or utilize superimposed lines of contrasting brightness or color or alphanumeric labels all acting together. The overlay projection apparatus then can be seen as a powerful tool for the emphasis of subject matter as is often used in television advertisement and printed communications. The graphics so moved by finger control on the touch panel are regenerated by the graphics overlay projector and follow smoothly on the audience screen when the aforementioned seven LMA operating requirements are met. Degradation of these cited operating requirements will subtly degrade low brightness underlay graphics and, give poor audience recognition in cases of high brightness overlay complex graphic projections. Overlay graphics position freezing or deletion is accomplished simply by touching the appropriate button graphic displayed on the touch panel screen. Similarly, through its microprocessor control, the video touch panel offers the means for selection, by the lecturer, of photographic slides as projected by an underlay slide projector and, other functions such as the control of overlay projector illuminance, and the selection of projected color to further enhance the contrast of the overlay image, all of which will be further discussed in the following description of the invention.

These advantages over the prior art and other advantages will become more obvious from the details of the description of the figures of the preferred embodiment of the apparatus of this invention.

A BRIEF DESCRIPTION OF THE DRAWINGS ILLUSTRATING AN EMBODIMENT

FIG. 1 is a perspective view of the overlay projector system shown projecting a set of overlay graphics against an underlay projection of a Sine and Cosine wave and their mathematical descriptions, Included in the figure are the overlay projector, its remote control touchpanel on a lectern and a peripheral portable computer all working with a conventional slide projector.

FIGS. 2A, 2B, and 2C are three views of the optics assembly.

FIG. 10A shows an example of a projected composite overlay against an underlay projection of a Sine and Cosine wave and their mathematical descriptions, where the overlay includes an example of projected highlighting graphics including an ARROW icon for pointing to the Sine wave, the SINE label, the OVERSTRIKE, in contrasting color, covering the Sine wave formula and the SQUARE icon for highlighting the Cosine wave.

FIG. 10B shows the touchpanel display of the ARROW icon in its start position and then moved to its desired position as determined by the lecturer's observation of the projection screen shown in FIG. 10A.

FIG. 10C shows the touchpanel display of the SINE label in its start position and then moved to its desired position as determined by the lecturers observation of the viewing screen shown in FIG. 10A.

FIG. 10D shows the touchpanel display of the OVERSTRIKE icon in its start position and then moved up to form an overstrike of the Sine wave formula by touch control location and expansion.

FIG. 10E shows the touchpanel display of the SQUARE icon in its start position and then moved up to its desired position to highlight the Cosine formula.

Figure 11A:
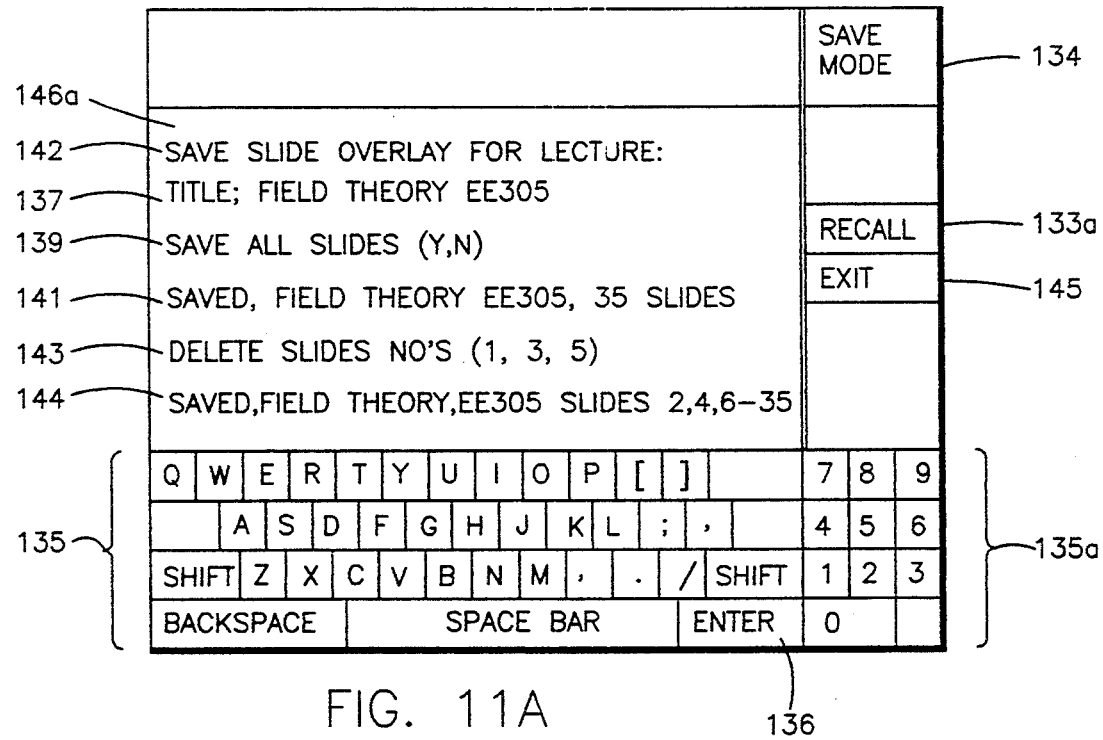

FIG. 11A illustrates the screen displayed on the control touch panel to enable the lecturer to store a complete series of overlay graphics, matching a set of underlay film slides, on floppy disc.

Figure 11B:
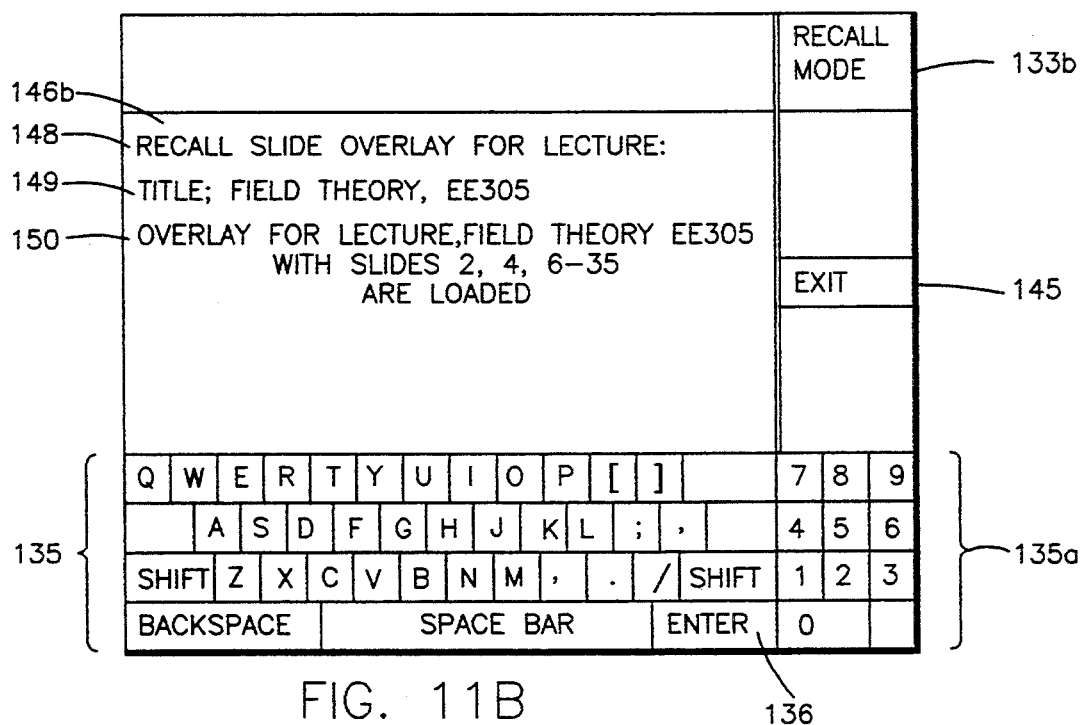

FIG. 11B illustrates the screen displayed on the control touch panel to enable the recall of any overlay graphic composite stored on floppy disc.

DETAILED DESCRIPTION OF THE ILLUSTRATED EMBODIMENTS

Figure 1:
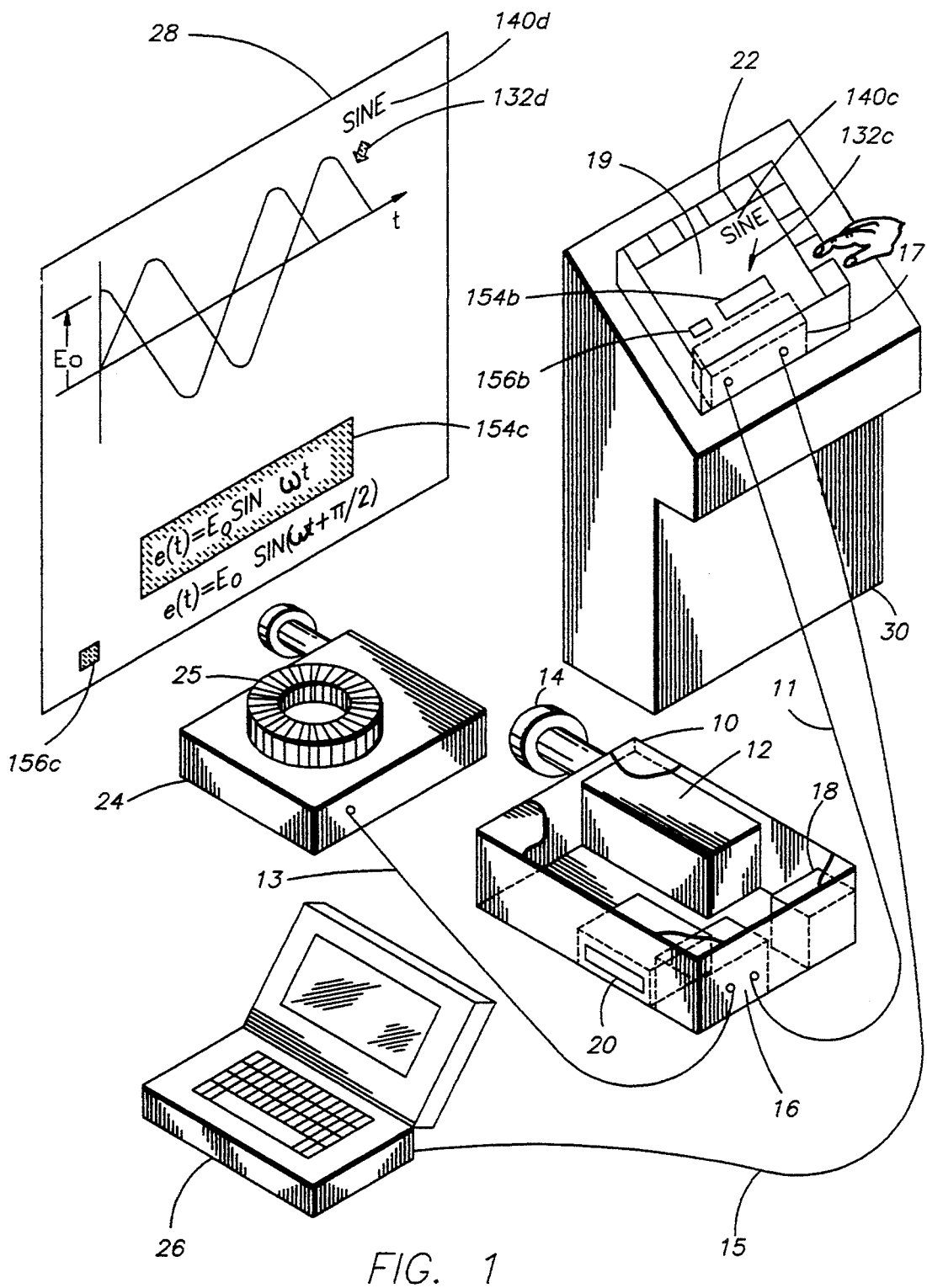

FIG. 1 shows an open-box isometric view of the overlay projector 10 and its remote control touchpanel assembly 22 located with the lecturer on the lectern 30 and electrically interconnected via cable 11. These two assemblies, which constitute the apparatus of this invention, are shown working with a conventional rotating carousel slide projector 24 which projects the primary image under discussion by the lecturer. Underlay slide projector 24 is electrically connected to overlay projector 10 via interconnect cable 13. Shown also in FIG. 1 is the audience viewing screen 28 upon which is projected, from slide projector 24, an underlay graphic representation of a Sine and Cosine wave and the mathematical formulas for both. These are shown as a convenient example of projected underlay graphics which, will be highlighted by the lecturer with the use of the apparatus of this invention, namely overlay projector 10 and remote control-touchpanel assembly 22.

Figure 2:
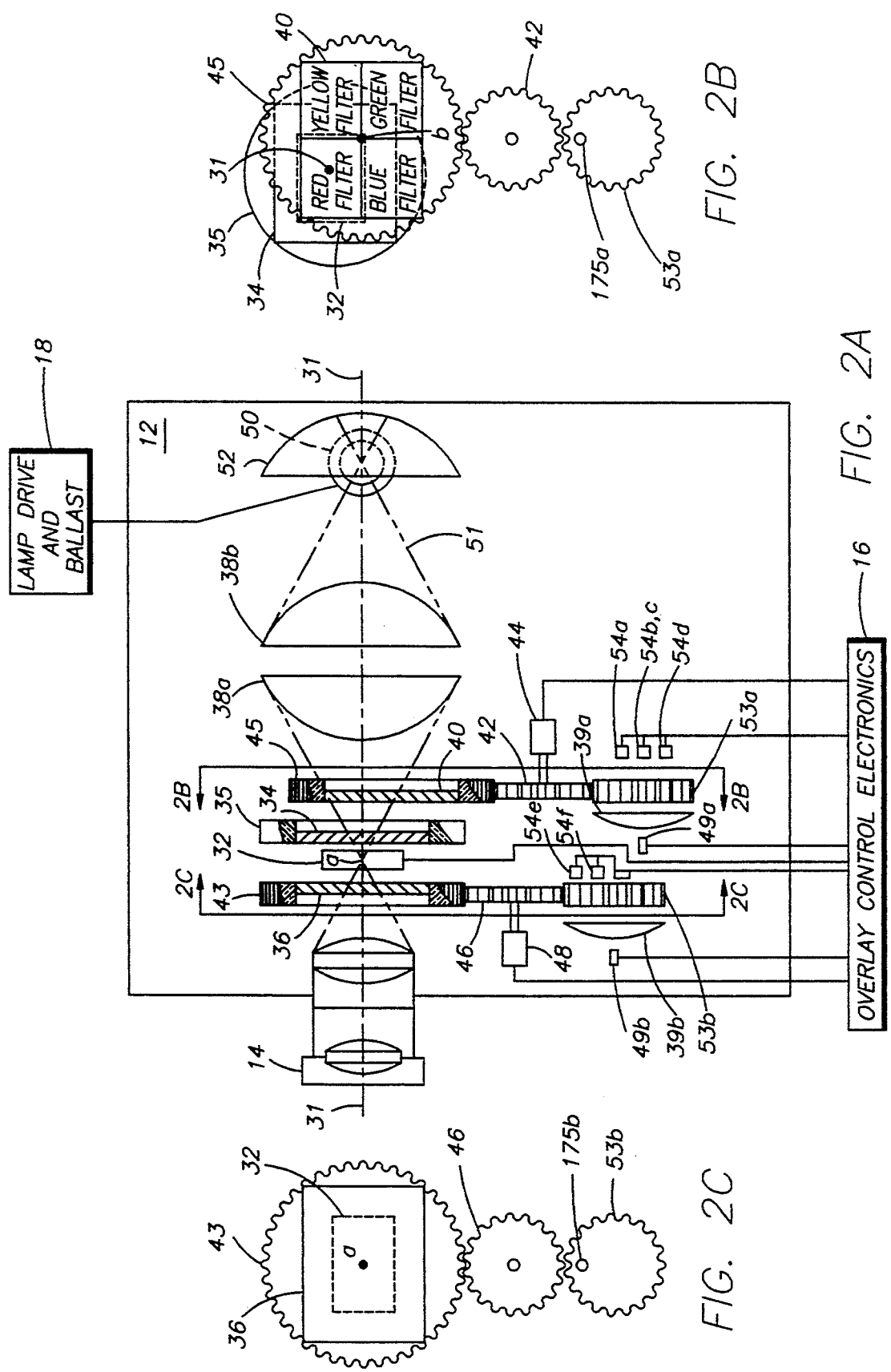
FIG. 2A is a side elevation of the basic components of the overlay projector optics assembly.
FIG. 2B is a front view of the rotatable filter wheel subassembly for overlay projected color selection.
FIG. 2C is a front view of the rotatable output polarizer subassembly for control of overlay projected brightness.

Referring now to overlay projector 10, the open box view shows the major components of this projector which are, the optics assembly 12 containing Light Modulator Array (LMA) 32, FIG. 2A working with projection lens 14, wherein the LMA is driven by control electronics 16 and illuminated by a high intensity light source 50, FIG. 2A which is controlled by lamp ballast 18. Shown also within the overlay projector is a high density floppy disc drive 20 used for archival storage of overlay graphics and code words required for matching projected highlighting graphics with its underlay slide image. Control electronics 16 located in the overlay projector and, 17 located in the remote control touchpanel, serve to drive the LMA and control the downloading of selected graphics from the remote control touchpanel 22 to the LMA and regenerate these graphics on the audience screen under the control of the lecturer. The means for this will be described in the following paragraphs discussing FIGS. 3,4 and 5. Lamp ballast 18 is necessary to control the operation of a high intensity metal halide lamp which is part of optics assembly 12.

Shown also in FIG. 1 is peripheral computer 26 connected to control electronics 17 via cable 15. Computer 26 is not a direct part of this invention but is designed in as a convenient tool for writing alpha-numeric label additions to the alphanumeric label library which is part of the digital memory in control electronics 17 residing in control-touchpanel assembly 22. This is shown also as an advantage of this embodiment since it allows a lecturer to utilize the ready availability of a portable computer such as a lap-top or notepad to rapidly input ad hoc words or words and numbers which may have been overlooked in the prepared primary graphic slides. The only requirement for portable computer 26 will be software and operating system compatibility with the system architecture of this invention.

FIG. 1 is seen to furnish a system operational overview of the preferred embodiment of this invention which is that the lecturer is provided with a remote control touchpanel assembly 22 which makes available any one of a group Of stored graphic icon pointers and highlighters which can be seen by the lecturer on display panel 19 upon apparatus power-up. Examples of these icons are shown in FIG. 1 as pointing arrow 132d, the SINE label 140d, rectangular highlighting line overstrike 154c and highlighting square icon 156c all of which are shown projected onto the audiance screen 28 superimposed over the primary underlay graphics in positions selected by the lecturer. The lecturers view on the remote display panel 19 is seen as pointing arrow 132c, SINE label 140c highlighting overstrike 154b and highlighting square 156b. These pointing and highlighting icons have been chosen by the lecturer as an aid in the explanation of the Sine and Cosine mathematical functions. As will be discussed in more detail below, the lecturer utilizes the remote control touchpanel to select each of the aforementioned pointing and highlighting icons by touch selection from a menu of displayed icons on display panel 19 and sequentially positions each icon and overstrike highlighting line by a simple finger movement over the display panel and subsequently freezes the final position of each pointing icon by touching a displayed FREEZE button. Storage, retrieval and display of all stored graphics are controlled within the apparatus of this invention by electronic control assemblies 16 in overlay projector 10 and 17 in the remote control touchpanel assembly 22.

Referring now to a side view of the overlay projector optics assembly 12 shown in FIG. 2A which is seen configured similar to a film projection system with the Light Modulator Array (LMA) 32 centered on the optic axis 31 in the film plane along with condenser lenses 38a and 38b, high intensity light source 50, ellipsoidal mirror 52 and projection lens 14. As in a conventional film projector, the condenser lenses 38a and 38b and light source 50 are designed to guarantee maximum uniform lighting over the plane of LMA 32. The ellipsoidal mirror 52 is designed and placed to reflect the light source image back onto itself so as to increase the effective brightness of the source. Light rays 51 are shown as an example of the optics design which is to guarantee that all of the source rays are directed equally through every point of LMA 32, for example point a, and will also fill the aperture of the projection lens 14 with the full image of the light source. Thus the optics are designed to assure uniform illumination of LMA 32.

In the preferred embodiment of this invention, the conventional projection system is converted to at, overlay projector by the addition of a Light Modulator Assembly (LMA) 32, a high intensity light source 50, projected color selection via control of color filters 40 and, projected light intensity variation via control of output polarizer 36. The result of these additions is to make possible the convenient projection of complex graphics including previously discussed pointer icons, alpha-numeric labels and highlighting line overstrikes in a very user friendly manner. This is achieved by the LMA 32 which is seen to spatially modulate the filtered source light as commanded by electrical drive signals from control electronics 16. Although broadband white light can be used, a user choice of different light colors offers better contrast for highlighting line overstrikes and alpha-numeric labels, Additionally, the LMA generates its best dynamic range when operating with selected narrow band light in lieu of white light. The high screen illuminance levels needed are provided by the combination of a high intensity metal halide lamp source 50 with its ellipsoidal mirror brightness enhancer 52. This light source system is able to generate brightness levels in excess of 25000 candles per square centimeter at electrical input power levels of less than 250 watts, An example of such an available source is the Osram HTI250W/SE. This light source also enables the overlay projector to be built at a reasonable cost and size which is one of the important objectives of this invention. The high source brightness is necessary in order to accept the absorption losses of the LMA and optical system and still achieve a screen illuminance at least 25% greater than the highest levels projected by conventional slide projectors at 20 feet, Most of the absorption losses are incurred in the input polarizer 34, the LMA 32, the output polarizer 36 and filter 40. To control the temperature rise in polarizers 34 and 36, LMA 32 and filters 40, due to the high level of radiated optical power, the color filters 40 and polarizers 36 and 34 are all mounted in good heat conduction support drums, for example aluminum drums, which facilitates cooling by forced or convection air flow, For example, color filter wheel 45 which is also a gear, will act as a heat sink for color filters 40 as can be seen also in FIG. 2B. Similarly, drum support 43 which is also a gear, and 35 which is stationary, will act as heat sinks for polarizers 36 and 34 respectively. Drum supports 43 and 35 will also act as a heat sink for LMA 32 since they remain in contact with its surface. Additionally, the design of drum 43, supporting output polarizer 36 also facilitates its being gear driven by drive gear 46 via stepper motor 48. The purpose of being able to control the rotation of the output polarizer about the optic axis 31 as seen in FIG. 2C, is to provide the lecturer with illuminance control of projected light. As shown previously in equation 1 of the Summary of the Invention, varying the relative angle of light polarization over a range of about 67 degrees by rotating the output polarizer will change the light transmittance over a range of approximately 4 to 1.

To be able to function effectively as an overlay projector under various levels of maximum projected screen illuminance of the underlay graphics projector, the overlay projector must be able to adjust its maximum light level to assure reaching a dark level over those areas of the projected overlay image which are controlled by turned off pixels, which is less than or equal to the dark level of the underlay projector. It is readily understood that an overlay projector dark level which exceeds the dark level of its companion underlay projector will obscure low light level graphics of the underlay projection and raise viewing audience discomfort.

The optics assembly 12 is also seen to include color filter wheel 45 which is composed of a solid drum gear containing color filters 40 driven by driving gear 42 via stepper motor 44. Color filters 40 are seen to include four different color filters, one in each quadrant which, for the preferred embodiment of this invention, are red, yellow, green and blue. As shown also in FIG. 2B, the axis of rotation b of the filter wheel 45 coincides with the lower right hand corner of LMA 32 and not optic axis 31. This orientation can be seen to position the centroid of each filter coincident with the optic axis for every 90 degrees of rotation of the filter wheel. Thus, it is readily seen in FIG. 2C that a projected color selection is made by commanding a 90 degree rotation of filter wheel 45.

For the preferred embodiment of this invention, LMA 32 is a 256 by 256 Ferroelectric liquid crystal array with light masking filling the spaces between the rows and columns of conductors in order to minimize light leakage through the array. Such a device is available, for example, from the Displaytech Company of Boulder, Colo.

A combination of physical factors and operating requirements including a compromised visual acuity of four minutes of arc for the normal eye due to the requirement for non optimal conditions such as non normal viewing angles and poor contrast ratio lead to the need for a projected pixel symbol height of about 1.9 inches at a viewing distance of 20 feet and a pixel density of about 4 per inch. The need for an LMA minimum size of 256 by 256 pixels can be seen to follow in order to fill a reasonable screen size at the 20 foot or greater viewing distance. Lesser numbers of pixels would be unable to cover a large enough screen size for a large auditorium or, for large screen sizes, force the optics to produce illegible graphics. Larger numbers of pixels are advantageous but press the state of the art of array fabrication and are therefore contrary to one of the major objectives of this invention which is a device of reasonable cost, size and reliability. As in a conventional projection system, projection lens 14 is adjustable along the focal axis in order to correct the focus of the image of the LMA plane on the projection screen due to changes in projector to screen distance.

As seen in FIG. 2A, high intensity light rays 51 are seen to pass through split condenser lenses 38a and 38b, and filter 40 and are therefore spectrally constrained before entering light polarizer 32. The spectrally constrained, polarized light now enters the light modulator where it will pass all pixels and either be further rotated by the electrically unexcited pixels or left unrotated by the electrically excited pixels to pass through output polarizer 36. Those rays passing the unexcited pixels and further spatially rotated will be blocked by the output polarizer. The net result is that only the spectrally limited rays passing into the electrically excited pixels will pass out of the output polarizer 36 the rest will be absorbed by LMA 32 and the output polarizer in the form of heat. This is the mode of operation of the Ferroelectric LMA device and is not this invention but is described herein to aid in the overall understanding of the operation and function of the apparatus of this invention which is a complex graphics overlay projector.

As in a conventional slide projector all the light passing through LMA 32 will be imaged on the projection screen. Since light penetration depends on the relative polarization of the input and output polarizers it is readily understood that when the polarizers are set for maximum penetration of polarized light, rotation of the output polarizer from a start position which allows maximum light penetration, will cause the output light to be attenuated, in fact, in the manner described by equation 1 in the Summary of the Invention section. Thus it is seen from equation 1 that light intensity can be smoothly attenuated over a four to one range by rotating the output polarizer over a range of approximately 67 degrees, In FIG. 2C, it is seen that output polarizer 36 is rotated by drive wheel 46 via steppermotor 48. Control of light intensity is essential to the operation of an overlay projector working over a range of underlay projected light intensity. It is readily understood that the overlay projector minimum light intensity must not be greater than the minimum light intensity produced by the underlay projector. This is what necessitates a light intensity adjustment feature for the overlay projector which can adjust the dark levels of the overlay projector to match the dark levels of the underlay projector. Control of steppermotors 48 and 44 is achieved via control subsystems 59 and 60 of FIG. 3 which are part of electronics assembly 16 and will be described more fully below.

The continuing description of the preferred embodiments of this invention will be divided into four parts describing the four different operating modes of electronics control assemblies 16 and 17 as follows:

A. Control of Projected Overlay Icons and Alpha-Numerics
B. Control of Color Selection
C. Control of Projected Brightness
D. Control of Peripherals

A. Control of Projected Overlay Icons and Alpha-Numerics

Figure 5:
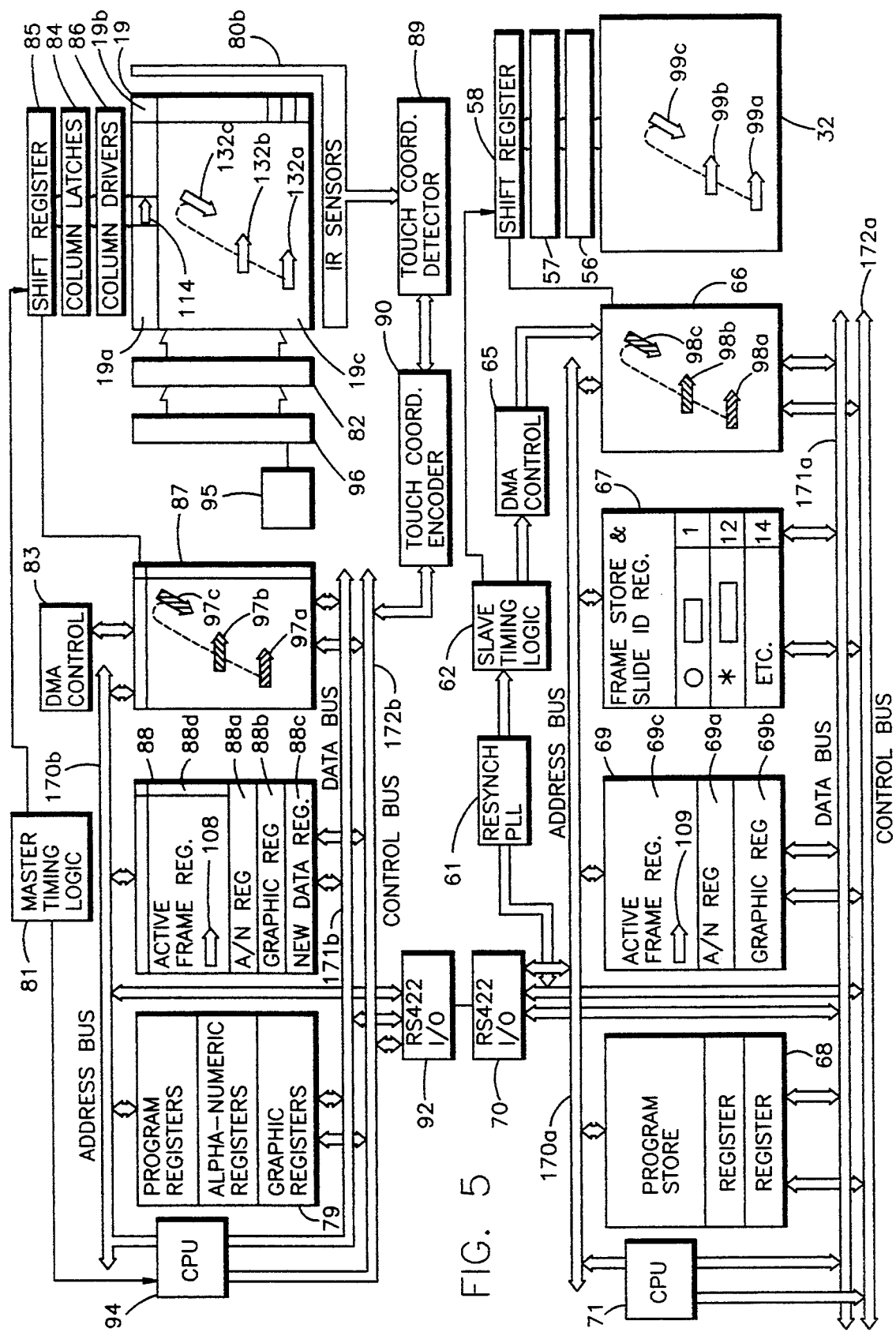
FIG. 5 is an illustration of all the major functional blocks of both control electronics subsystems operating together.
Figure 6:
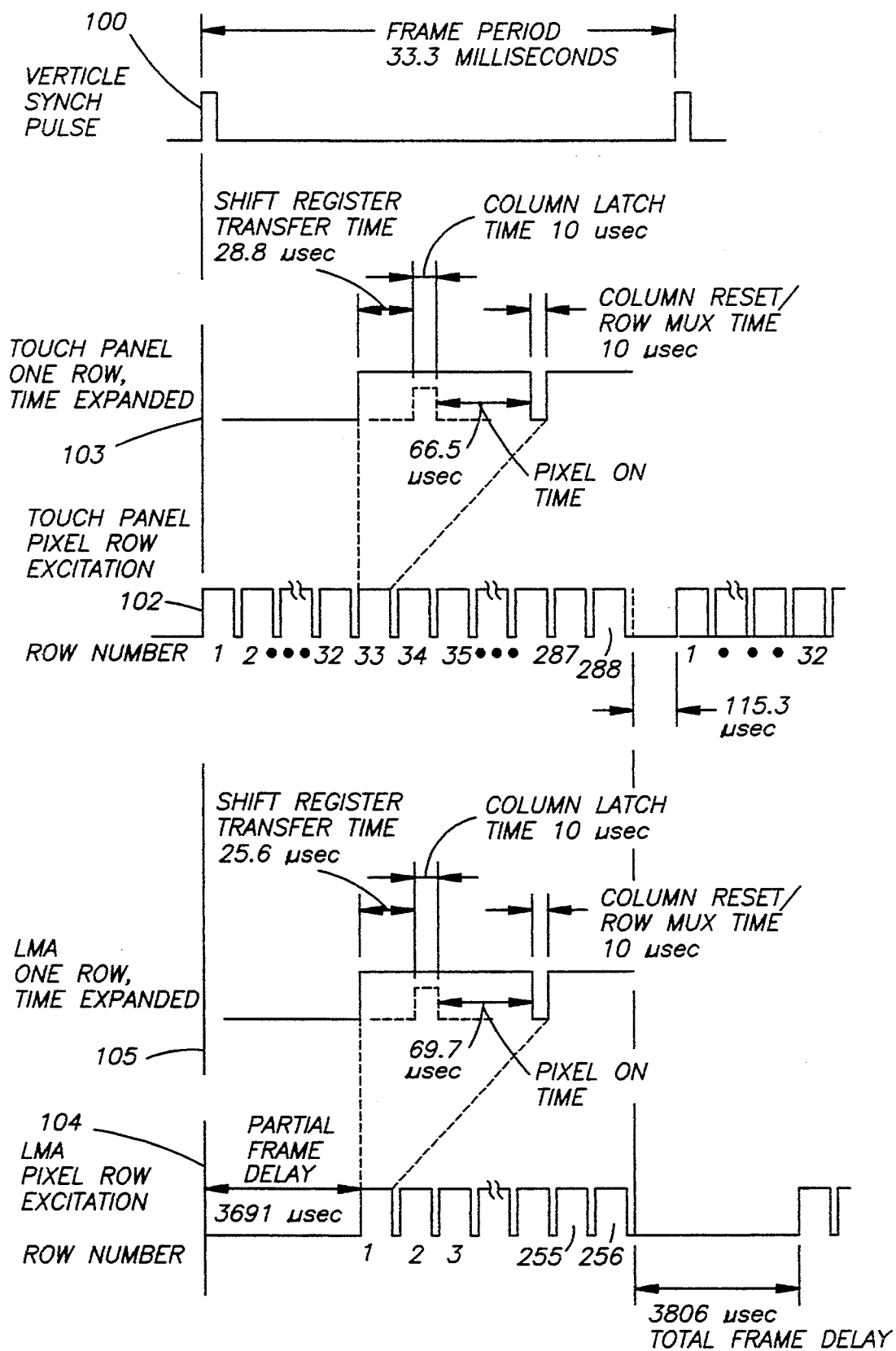
FIG. 6 is a timing diagram showing the major control signal sequences of the remote control touchpanel display and the LMA raster timing.

Projected overlay icons and alphanumerics are generated and positioned by overlay control electronics 16 and remote touchpanel control electronics 17 communicating digital data between remote control touchpanel assembly 22 and overlay projector 10. Touchpanel control electronics 12 is shown functionally in FIG. 4 and overlay projector control electronics 16 is shown functionally in FIG. 3 while the essential operating elements in FIGS. 3 and 4 for this A modality are shown functionally in FIG. 5. Referring first to FIG. 5, an electroluminescent (EL) display panel 19 and LMA 32 are designed to operate synchronously and receive scan control and video data in the same manner although for this embodiment, they do not contain the same number of pixels. This is because display panel 19 uses the first 32 pixel lines for generating margin 19a, and the last 32 pixels of each line to generate right hand margin 19b leaving display area 19c open and containing an array of 256 by 256 pixels as does LMA 32. As seen more clearly in FIGS. 9A and 9B, for this preferred embodiment, margin 19a displays a menu of six selectable icons, while margin 19b contains a display of control buttons. Thus, while LMA32 is a 256 line by 256 row of light controlling elements, display panel 19 is a 288 line by 288 row of light emitting pixels. Synchronous operation is achieved by appropriate frame interrupts at the beginning and end of each LMA 32 frame and at the end of each display panel 19 frame. This will be discussed more fully below in the description of the timing diagram of FIG. 6. The elements that operate together to generate displays on display panel 19 are Random Access Memory (RAM) 87, Shift Register 85, Direct Memory Access (DMA) Control 83 and RAM 88. RAM 87 is configured to match in word size the total pixel size of display panel 19. Thus RAM 87 is an 82,944 by 1 bit device corresponding to 288×288 pixels while, its counterpart, RAM 66, is a 65536 by 1 bit device corresponding to 256×256 pixels. RAM bit configurations also match display pixel configurations so that RAM 87 contains 288 rows of 288 bits each with addresses that match the pixel locations of display panel 19, while RAM 66 contains 256 rows of 256 bits each with addresses that match the physical location of LMA 32 pixels. For this embodiment of this invention, graphic displays are formed on display panel 19 and in LMA 32 as follows;

RAM 87 is supplied graphic and alphanumeric data from Active Frame Registers 88d of RAM 88 via data bus 171b, address bus 170b and control bus 172b and this data is updated once each frame period which, for this embodiment, is 33.3 milliseconds. Similarly RAM 66 is supplied data from Active Frame Registers 69c of RAM 69 via data bus 171a control bus 172a and address bus 170a and is updated once each frame period. During each frame period data in RAM 87 is read out to shift register 85 under control of signals from master timing unit 81 and a counter in DMA control 83. Lines are read out of RAM 87 in sequence, starting from the top down, at a rate of 100 nanoseconds per bit, into Shift Register 85. Each shift register signal is then latched into 288 Column Latches 84 in 10 microseconds, applied to all columns by signal drivers 86 and displayed for 66.5 microseconds. This is followed by turning off the top pixel row and turning on the row below it by Row Mux 96 and row drivers 82 while simultaneously resetting Column Latches 84. This whole row data transfer period takes 115 microseconds as shown on time line 103, the expanded illustration of the period of the 34th row of pixels. The sequence is now repeated until all 288 rows of RAM 87 data are read out. This is followed by a frame interrupt period of 115 microseconds as shown on line 102, The touch panel frame timing. Similarly the signal data in RAM 66 is read into Shift Register 58 stored in column latches 57, applied to all 256 columns of LMA 32 by column drivers 56 and displayed for 69.7 microseconds to maintain the 115 microsecond period per line and thereby maintain synchronism with the scanning of display panel 19. This can more readily be seen by referring now to the timing diagram of FIG. 6 which shows the scan timing relationships between touch panel frame timing 102 of display panel 19 and frame timing 104 of LMA 32. Illustrated here is how each row data transfer period is held identical at 115.3 microseconds and in synchronism with each other, thereby overcoming the difference in numbers of pixel rows and columns while operating at the same shift register clock rates. As seen in FIG. 6, the scanning of LMA 32 is delayed by a period corresponding to 32 rows of the touch panel display 19 time which, for this embodiment, is 3691 microseconds, Thus the first scanned row of LMA 32 corresponds with row 33 of display panel 19. The difference in time required to shift signals by 288 columns down shift register 85, FIG. 5 and the 256 columns connected to shift register 58 at the same clock rate is compensated by elongating the display time of LMA 32 by about 3 microseconds to 69.7 microseconds compared to 66.5 microseconds for touch display panel 19. Also, as illustrated in FIG. 6, maintaining display real time synchronism at the frame period of 33,333 microseconds for the displays of this embodiment requires a frame interrupt of 115 microseconds or one row period for display panel 19 while the same row period is added to frame delay 106 for a total frame interrupt period of 3806 microseconds for LMA 32. Thus, both display rasters remain synchronized as illustrated by common vertical synch pulse 100, FIG. 6.

The technique utilized in this embodiment for the formation of graphic patterns and alphanumerics is to write a one in the pattern space that must be illuminated and zeros where the pattern remains dark. Referring now to FIG. 5 the example of ARROW icon 132a is illustrated as formed of all one's in the register addresses represented by shaded area 97a of display RAM 87 and zero's everywhere else, From this it can be seen that patterns representing arrows or other icons are readily moved by changing the address of the one's pattern in RAM 82. Similarly it can be seen that the ARROW icon 99A shown on LMA 32 is formed as a result of placing an arrow pattern of all one's in the register addresses represented by shaded area 98a of RAM 66 and reading that data into LMA 32 as previously described. Also it is readily understood that the pixel address location of ARROW icon 99a is determined by the bit addresses of ARROW icon 98a in RAM 66 and therefore, position movement and position are controllable by changing the addresses of ARROW icon 98a in RAM 66. This is illustrated by the movement of ARROW icon 98b and 98c in RAM 66 which 18 followed on LMA 32 by ARROW icon 99b and 99c. Similarly, the movement of ARROW icon 97a to new position in RAM 82 is followed on display panel 19 as ARROW icon 132b and 132c.

As mentioned previously, RAM 87 receives it's data from the active frame registers 88d of RAM 88 and this data is updated thirty times per second or every 33.3 milliseconds. As seen in FIG. 5 the registers in RAM 88 are divided into four main sections wherein registers 88a store original alphanumeric data, registers 88b store original graphic icons, registers 88c are dedicated to all new icon and or alpha numeric data and registers 88d are a one to one simulation of RAM 87 both in size and bit organization. Thus, for example, when CPU 94 commands a fetch of an arrow icon by a touch command on display panel 19, the program stored in PROM 79 will select the ARROW icon graphic from RAM 88 registers 88b and move it to addresses in RAM registers 88d representing the initial icon position shown in the FIG. 5 as ARROW icon 108 which is the equivalent of the lower left hand corner of display panel 19. Any change in position or orientation of ARROW icon 108 as commanded by touch on display panel 19 is directed from CPU 94 via the program in PROM 79 to RAM 88 and that new location and orientation data gets updated in RAM 87 in the next frame period.

Position and orientation control is accomplished with the aid of an icon orientation program subroutine as part of the control program written into PROM 79 and PROM 68. This subroutine translates the icon without rotation if it is first touched at its centroid or, rotates the icon about its centroid if it is first touched outside of its centroid. The subroutine in this case inhibits translation while allowing only clockwise or counterclockwise rotation. Thus positioning and orientation of icons or displayed labeled require a small amount of touch skill which is quickly developed after a few trials. CPU 71, PROM 68 and RAN 69 also operate together in an identical manner to their counterparts in control subsystem 17 to fetch active graphics or alphanumeric data from RAM 69 registers 69a and registers 69b and move the selected data to Active Frame Registers 69c from where they serve to update RAM 66 in succeeding frame periods.

All modalities and control commands are initiated by touching display panel 19 either within the margins 19a and 19b to select a modality or, within display area 19c to control the position or orientation of a selected graphic icon or alpha numeric label. For this embodiment, the coordinate location is achieved by the selection of one of 4000 possible grid coordinates formed by 80 verticle and 50 horizontal intersecting infra red light beams generated by Infra red Light Emitting Diode (LED) array 80a shown in FIG. 4. The display panel 19 with this form of touch control is readily available from several companies such as Deeco of Hayward, Calif. and is not to be considered as this invention but only a part of the overlay projection system which is this invention. Placing a finger or pointing stylus in the light field locates its position because it interrupts several intersecting beams which are detected by a juxtaposed photosensor array 80b seen in FIG. 4. Here it is understood that there are 50 photosensitive sensors oriented vertically to detect the horizontal light beams and 80 photosensitive sensors oriented horizontally to detect the 80 vertical light beams all of which it is understood are part of array 80b. All 130 received signals are fed into Touch Coordinate Detector 89 which contains 130 signal conditioning channels and a pair of multiplexers, (80 to 1 and 50 to 1) which reduce 130 channels of information to two channels and, a pair of analog to digital (A/D) convertors. The A/D convertors output two 8 bit parallel words to Touch Coordinate Encoder 90 which converts the digital input information to a 12 bit coordinate location and holds this in a register until read into the CPU 94 via Data Bus 171b. The coordinate word is than used to select a modality and, for this example, calls up ARROW icon 108 from RAM registers 88b as discussed previously. Additionally, when in this mode, the coordinate word includes one extra bit to identify the icon selected as active. Thus, the program controlling its translation will respond only to the identified active icon and no other. This simplifies freezing the final location and orientation of the selected icon by deleting the active identifying bit when the FREEZE command is evoked by the lecturer.

As discussed previously, electronic control subsystems 16 and 17 communicate with each other via RS 422 ports 70 and 92 as seen in FIG. 5. It is therefore readily understood that all coordinate command words transmitted to CPU 94 are also transmitted to CPU 71 via the RS 422 serial communicators.

Referring now to FIG. 5, it is understood that PROM 68 contains the controlling program for the operation of Overlay Projector 10. Under control of this program, the coordinate word received from CPU 94 commands a fetch of ARROW icon 109 from RAM 69, register 69b and moves it to addresses in RAM 69c corresponding to the lower left corner of LMA 32 which is the initial position. As previously discussed for operation of display panel 19, ARROW icon 98a will be loaded into DISPLAY RAM 66 in the next frame period and then into LMA 32 as ARROW icon 99a thereby generating its image as an overlay graphic on screen 28 of FIG. 1. The Arrow Icon is used only as an example to illustrate how control electronics 17, FIG. 1, in control-touchpanel assembly 22 works with control electronics 16 in overlay projector assembly 10 to control the selection of any stored graphic or alpha numeric label and to simply locate, and orient its projected image. It is also readily understood that this kind of graphic reproduction and control readily enables a FREEZE command by simply negating the previously described select bit. A DELETE command is also readily accomplished by deleting the graphic from the active frame areas of RAMs 88 and 69.

Figure 3:
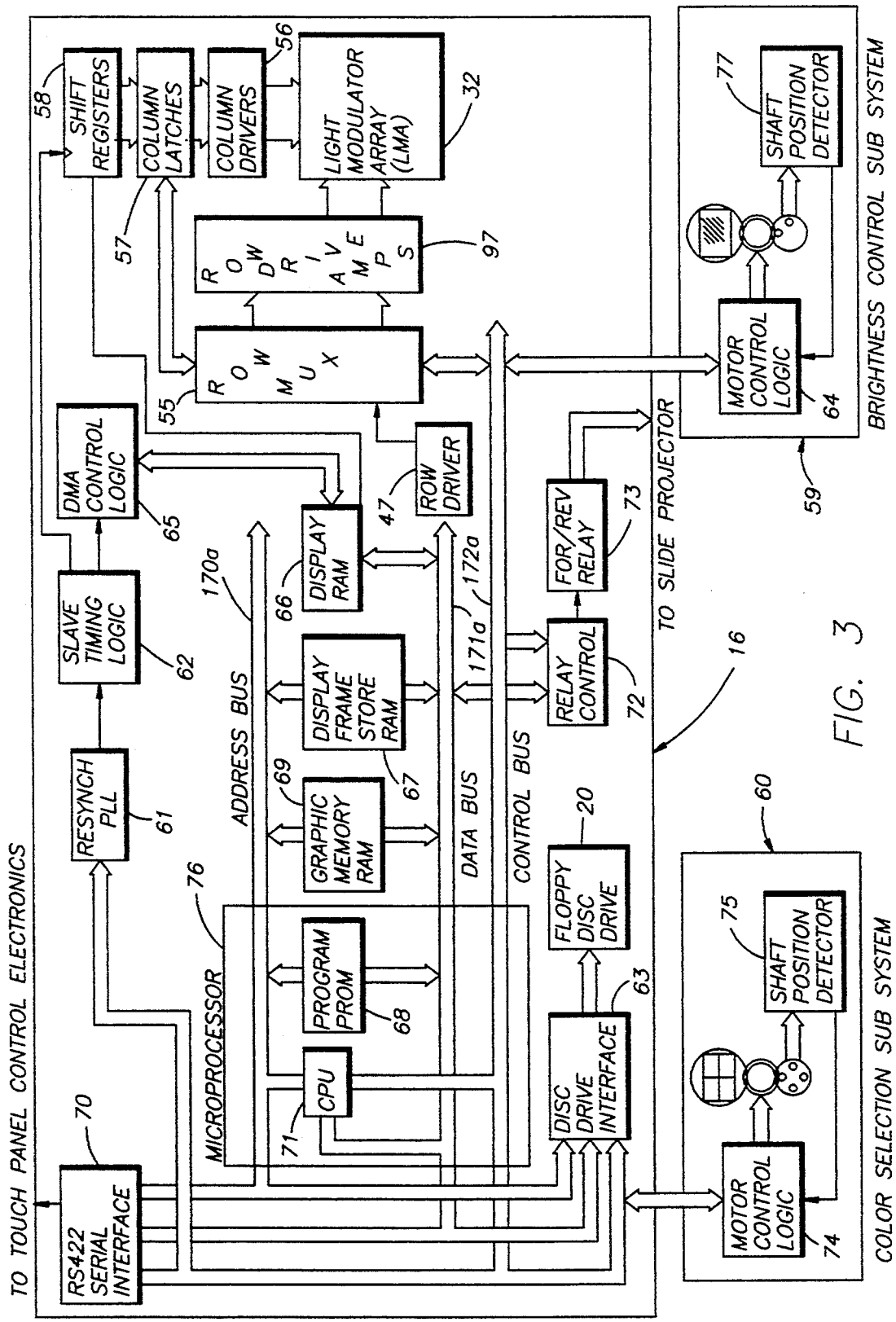
FIG. 3 is a functional description of that part of the control. electronics subsystem within the overlay projector enclosure.
Figure 9A:
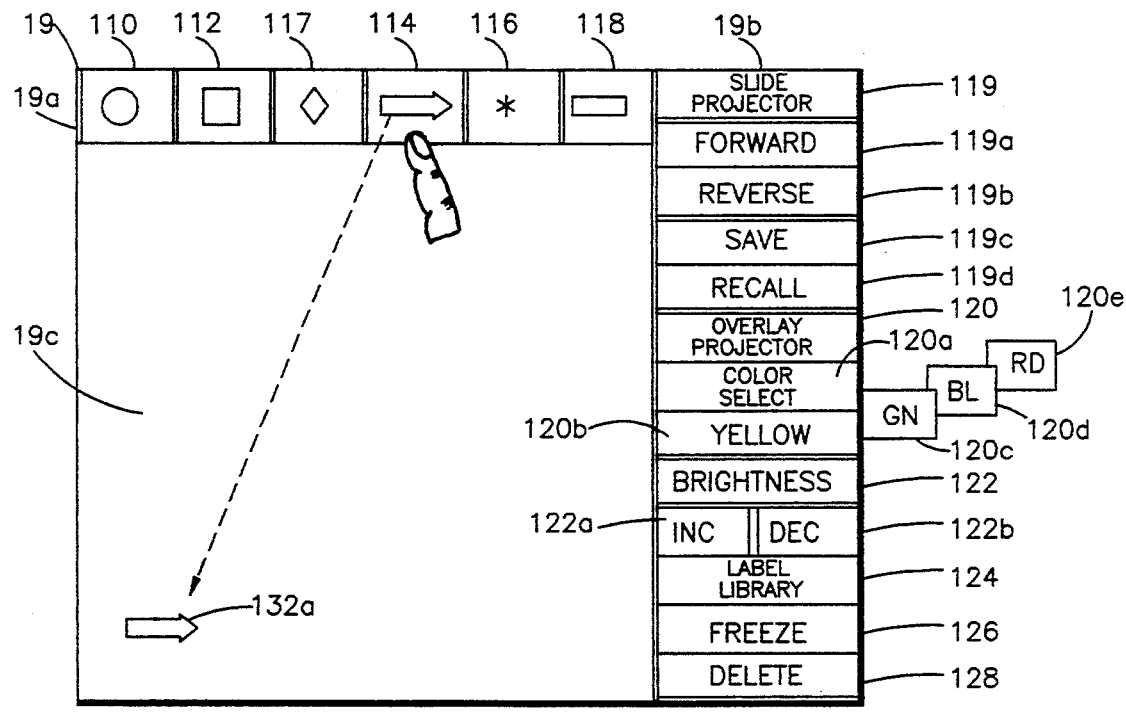
FIG. 9A shows the power-up default page of the remote control-touchpanel display offering stored icons and control buttons.

Continuing with the description of the operation of this modality, and referring to FIG. 5, RAM 67 is included to store the FREEZE positions of all overlay composites matching, for this embodiment, up to 100 underlay slides. This is achieved by reading sequentially all graphic and alpha numeric FREEZE position addresses along with graphic formation data and an assigned slide identification numbers into RAM 67 on command of a slide change from the lecturer via display panel 19. A slide change command is interpreted from the coordinate position of its displayed button and works by clearing all data from active frame registers 88d and 69c in addition to storing the FREEZE positions in RAM 67. Thus a complete overlay composite is stored in RAM 67 for immediate recall by the lecturer. Alternatively, the lecturer can store the same information on floppy disc located in Floppy Disc Drive 20 which is part of overlay projector assembly 10 as seen on FIGS. 1 and 3. As seen in FIG. 3, communication between Disc Drive 20 and RAM 67 is conventionally established over bus lines 170a, 171a and 172a which connect via disc drive interface 63 and is controlled by CPU 71 when the lecturer commands a SAVE by touching the SAVE button on display panel 19 as seen in FIG. 9A.

Having discussed now the electronic means provided by this embodiment of this invention for the formation, control and projection of an overlay icon, the following paragraphs will describe an example of the formation, control and projection of a complex set of overlay graphics by the lecturer or other user of this device. Referring now to FIG. 10A, which is an illustration of an underlay graphic that could be used by a lecturing instructor in teaching, for example, Alternating Current fundamentals. Projected on screen 28 are graphic Sine wave 160 and Cosine wave 161 and their mathematical equations 162 and 163. The overlay projections from slide projector 24 used by the instructing lecturer include ARROW icon 132d SINE label 140d, highlighting OVERSTRIKE 154c and highlighting SQUARE 156c, all of which are brought up by and moved to the position shown by the lecturing instructor using the apparatus of this invention. Referring first to FIG. 108, which is a partial illustration of display panel 19 showing first that the lecturer selects the ARROW icon 114 by touching its display in margin 19a. This, as described earlier, brings up the arrow icon in start position 132a and causes it to be projected to the same location on screen 28 as has been previously described. In this modality, a touch first to the centroid of the displayed ICON followed by a translational finger motion across display panel 19c generates coordinate command sequences that corresponds to repositioning of the displayed ICON as was also explained earlier, This is illustrated by ARROW ICON positions 132b and 132c which is the lecturers desired final location. As described earlier, the icon graphic will also follow this movement on LMA 32 and therefore on SCREEN 28 where it is illustrated as ARROW icon location 132d and where it is utilized to point to underlay Sine wave 160. Rotation of the arrow icon at position 132d is accomplished by first touching outside of the icon centroid which will cause icon rotation in lieu of translation, about its centroid under control of the touching finger or touching instrument. The means for this control is a stored subroutine which was also discussed in previous paragraphs. At this point, the lecturer touches FREEZE button 126, which deletes the icon identification bit and makes the system no longer responsive to touch commands to ARROW icon 132c.

In a similar manner, SINE label 140a is moved to its final location 140c as seen in FIG. 10C. However, for this described embodiment, alpha-numeric labels are selected from the label library which is activated by touch to LABEL LIBRARY button 124, FIG. 9A. This touch command brings up the label library screen shown in FIG. 9B from which the SINE label 142 is selected by touch and where it is automatically translated to start position 140a as was the previously selected ARROW ICON 114. The lecturer simply exits this screen by touching the page EXIT button 145 to return to the display of FIG. 10C. The lecturer now moves SINE label 140a through position 140b to position 140c and freezes that position by touching FREEZE button 126. Now, both ARROW icon 132d and SINE label 140d are projected on screen 28 as shown in FIG. 10A. The lecturer now wishes to use the apparatus of this invention to highlight Sine formula 162. This is done by touch selection of OVERSTRIKE icon 118, FIG. 10c in margin 19a which moves it to start position 154a. Recognition of the selection of highlight bar 118 by CPU calls up a second subroutine stored in PROMs 79 and 68 which are structured to enable control of the horizontal dimension of OVERSTRIKE icon 118 after the first FREEZE command is invoked. This subroutine now responds to the lecturers touch by elongating or shortening the overstrike bar in response to touch coordinate numbers until the second FREEZE command is invoked by touch to FREEZE button 126. The final OVERSTRIKE ICON is projected at position 154c on screen 28 as seen in FIG. 10A. It is understood that the lecturer is easily guided in positioning the aforesaid graphics by observing their movement on screen 28 in response to touch commands. Finally, the lecturer decides to bullet-highlight Cosine formula 163. This is done as before by touch selection of square ICON 112 on display panel 19a and translating it from position 156a to position 156b as seen in FIG. 10E. This completes the illustration of an example of the utilization of a complex graphic overlay by means of the apparatus of this invention.

B. Control of Color Selection

Both projected color selection and brightness control are available to the lecturer from remote control display panel 19 in the form of button displays appropriately labeled, as shown in the right hand column of the default display of FIG. 9A. For the preferred embodiment of this invention, the default projected color selection is YELLOW as seen on button 120b. Therefore, on power-up, the overlay projector projects in yellow and button 120b shows the label YELLOW. Touching button 120b changes the button label to 120c. GREEN which selects the green filter and turns the overlay projections to green. Subsequent touch selections turn the projected colors to blue and red and the selection cycle repeats.

Referring now to FIG. 3 which shows color selection subsystem 60, it can be seen that this subsystem connects to control bus 172a over which stepper motor commands are transmitted from CPU 71. As previously described, the 12 bit control word generated by touch coordinate encoder 90, FIG. 4, in response to touch selection by the lecturer, selects a mode and commands an action determined by the program in PROM 79. When color selection button 120 is touched, the programmed action is a command for rotation to stepper motor 44, FIG. 7.

Figure 7:
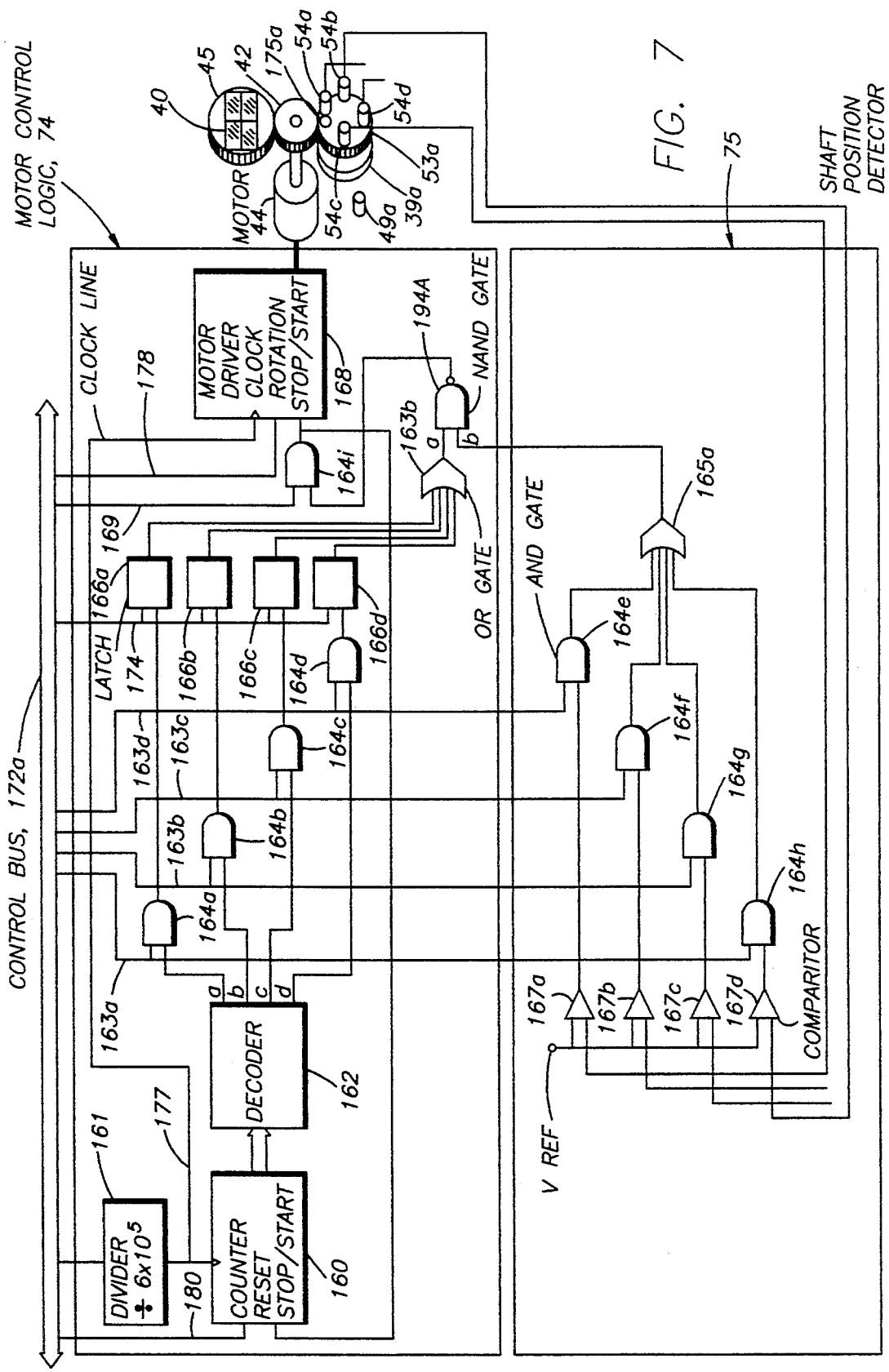
FIG. 7 is an expanded functional diagram of the color selection control subsystem.

Assuming now that said color selection subsystem 60 has reset following power up, to its initial yellow color position and a green color is selected by the lecturer. The following will occur;

Referring first to FIG. 7 which is an expanded illustration of color selection subsystem 60, FIG. 3, which is seen as a closed loop system including essentially motor control logic block 74, which controls the motion of stepper motor 44 and its load of color filter wheel 45, within which color filters 40 are mounted, drive gear 42 and shaft position monitor gear 53a, outputting shaft position signals into shaft position detector block 75 which closes the electrical loop back to motor control logic block 74 via NAND gate 194a. For this embodiment, stepper motor 44 moves 7.5 degrees per step. This kind of stepper motor characteristic is readily available from many sources such as Airpax of Cheshire, Conn. The gear ratio between motor drive gear 42 and color wheel 45 is 1:7.5 and similarly the gear ratio from drive gear 42 to shaft monitor gear 53a is 1:7.5. Each clock pulse into motor driver 168 generates one stepper motor 44 step of 7.5 degrees which produces one degree of rotation of both color wheel 45 and shaft monitor gear 53a. When a green color selection is made after power-up, the color select 12 bit coordinate command is turned into a 7 bit motion command by the program in PROM 68, FIG. 3. The 7 bit motion command is transmitted over control bus 172a to seven control lines going into the color selection subsystem 60. These control lines operate as follows; control line 169 which carries up-counter 160 and motor driver 168a start/stop command via AND gate 164i, goes to binary one to start counter 160 counting up from zero and start rotation of motor 44. Line 180 which carries counter 160 reset command stays at binary zero since the counter has been reset following power-up. Control line 178 stays at a logic one level which also follows power-up and commands clockwise rotation of stepper motor 44. Control line 174 which carries a pulse reset command that operates on power-up and after every color selection, has set the output of the four latches 166a-166d to logic zero, and control lines 163b which carries an enable command to AND gate 164b is set at logic level one, while the 163a,c and d control lines are left at a low level. Counter 160 and motor driver 168 receive clock signals from divider 161 over line 177. The clock signals drive stepper motor 44 through driver 168 which is a commercially available stepper motor driver integrated circuit available from many sources including the Airpax Company previously mentioned.

Divider 161 converts the system 20 Mhz clock to 33 Hz. which, for this embodiment is selected to enable a color changes in 2.7 seconds. Decoder 162 which receives the counter output, has four output lines which go uniquely to a binary one level at each whole number multiple of a ninety count input from counter 160. Motor driver 168 requires a logic level one at its stop input to allow it to follow the clock step input from line 177 and to drive stepper motor 44. Thus the motor will turn and be stopped after 675 degrees of rotation when the counter reaches a count of approximately 90 while filter wheel 45 will have rotated 90 degrees. Starting with the b output of decoder 162 going to a logic one level at a count that for this embodiment, is two degrees less than the ordered rotation or, 88 counts which, sets a logic one at the output of latch 166b. Motor 44 continues to step another two degrees and is stopped by photosensor 54b recognizing a shaft rotation of 90 degrees. This is guaranteed when the input terminal a of NAND gate 194a sees the logic one level of the b terminal of decoder 162 through latch 166b and OR gate 165b and input terminal b of NAND gate 194a sees a logic one feedback level as a result of 90 degrees of rotation of filter wheel 45. The feedback circuit is seen to monitor the output of the four photo sensors 54a,b,c and d via comparitors 162a,b,c, and d which are accessed through AND gates 164e,f,g and h and four input OR gate 165a. In the feedback circuit, photo sensors 54a,b,c and d are seen to be activated by light from light emitting diode (LED) 49a through spreading lens 39a and disc hole 175a. The logic feedback loop provided by shaft monitor gear 53a assures that the shaft travel will be limited to 90 degrees in the event that mechanical drag or friction inhibits the motor from precisely following its stepper drive pulses.

From previous discussion of the function of the color filter wheel 45, it is understood that 90 degrees of rotation are needed to properly align each one of the four filters thereon with optic axis 31 of FIG. 2A. Thus it is seen that color selection subsystem 60, FIG.3 guarantees that the motor shaft will rotate in selected multiples of 90 degrees depending on the color selection, by controlling the number of steps of stepper motor 44 with up-counter 160 and its forward logic and, monitoring and limiting motor shaft rotation via logic feedback from four shaft angle photo sensors 54a–54d, placed at each rotational quadrant. It can be seen that in this design embodiment, color selections must be made sequentially due to the nature of the single color selection buttons 120b,c,d and e, FIG. 9A. This negates the need for two directions of color wheel rotation. Latches 166a–166d are seen as a memory devices that sets up a pre-stop command within 2 degrees ahead of the shaft position feedback stop command, which together stop motor 44 rotation within a small error of the ordered 90 degrees. At each stop position, control line 174 resets latches 166a–d, in preparation for the next color selection.

C. Control of Projected Brightness

Figure 8:
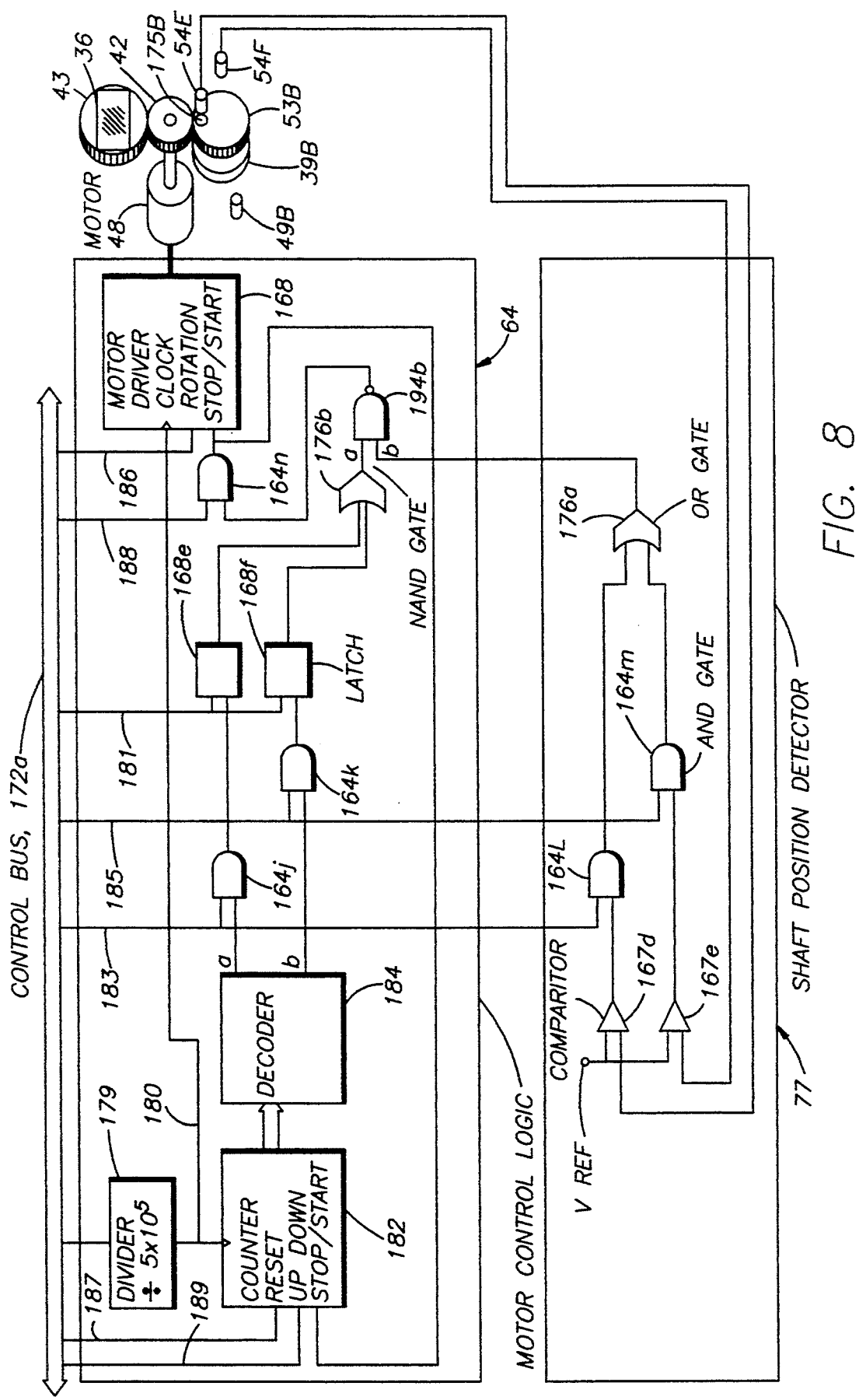
FIG. 8 is an expanded functional diagram of the brightness control subsystem.

Referring now to FIG. 8 which is an expansion of brightness control subsystem 59, FIG. 3, and is similar in design to color control subsystem 60 described in the previous paragraphs in that it is also a closed loop control system. It is also seen to include three input integrated circuit 168 driving stepper motor 48 which drives wheel 43 within which is mounted output polarizer 36. Drive gear 46 is also seen to drive shaft position monitor gear 53b with hole 175b which enables optical sensing of the initial shaft angle and 90 degrees of clockwise rotation from the initial position by photosensors 54e and 54f detecting light from LED source 49b through spreading lens 39b. This control subsystem is also seen to include a forward control path consisting of up/down counter 182, which outputs its count to a two output decoder 184 which, in turn, delivers its logic output levels over two channels of two input AND gates 164j and 164k. Continuing the forward loop, the AND gate outputs are stored LATCH's 166e and f depending on which is enabled and, these outputs in turn feed two input OR gate 176b which outputs a logic level to the a input terminal of two input NAND gate 194b. NAND gate 194b is the sum point of the closed loop system since the feedback logic level developed from shaft photosensors 54e and 54f develop a logic level which ties back to the input terminal b of NAND gate 194b. The rest of the feedback loop is seen to include two channels of comparitors 167d and 167e operating into a pair of two input AND gates 164l and 164m which are seen connected to two input OR gate 176a which, in turn, outputs its logic level to the sum point terminal b of NAND gate 194b.

Brightness control subsystem 59 operates in a is very similar manner to the color control subsystem 60 in that it is totally controlled by a seven bit command word transmitted over control bus 172A. Stepper motor 48, is also similar as are the gear ratios of 1 to 7.5 for driver wheel 46 to both the polarizer wheel 43 and shaft monitor gear 53b. It is also readily understood that polarizer wheel 43 and shaft monitor gear 53b move at the rate of one degree per clock cycle of clock line 180 or one degree per count of counter 182 as does the drive system of color selection subsystem 60. This subsystem however uses a motor clock frequency that is slowed to 25 Hz in order to extend the time of 90 degrees of rotation of the polarizer wheel 43 to 3.6 seconds. This is a brightness adjustment compromise between too much time to make a large adjustment and too fast to judge its effect.

The seven control lines from control bus 172a to subsystem 59 carries the seven bit command word for a brightness change from display panel 19. Assuming a brightness decrease command by the lecturer touching DEC button 122b, the command word would be set as follows;

Control line 186 would carry a zero logic level which sets up motor driver 168 to drive stepper motor 48 in a counter clockwise direction, driver control line 188, which carries the motor and counter start/stop command, would be set to logic level one, which would start the motor step rotating under control of the 25 Hz clock input. Simultaneously, the same bit command would start counter 182 counting up as determined by the bit on control line 189. For this assumption of decreased brightness following power-up, a logic one level would be assigned which makes the counter count up. Control line 187 which acts to reset the counter on power-up would have already done so and rests at a zero logic level. Control lines 183 and 185 would be set depending on the direction of rotation of polarizer wheel 43 to limit its rotation to the first quadrant, 0 to 90 degrees. Given that the required rotation of polarizer wheel 43 and shaft monitor gear 53b is clockwise toward 90 degrees, control line 185 would be set to logic level one and control line 183 to logic level zero. Stepper motor 48 now steps clockwise and rotates polarizer wheel 43 at a rate of one degree every 40 milliseconds. If the decrease brightness command is halted by the lecturer lifting his finger from DEC button 122b, CPU 71 and its program in PROM 68 interpret this as a stop command and change the logic level on control line 188 to zero thereby freezing the position of motor 48. If the lecturer had maintained the decrease brightness command until polarizer wheel 43 had rotated 90 degrees, the forward and feedback loop would act to automatically stop the motor and set the seven bit control word bit levels so that only an increase brightness command would start motor rotation. Reference to FIG. 8 will show that at the ninety count of counter 182, which corresponds to 90 degrees of rotation of polarizer wheel 43, decoder 184 would output a logic one level at its b output terminal which would be passed through enabled AND gate 164k, then latched at the output of latch 166f and produce a logic one level at the a input terminal of NAND gate 194b. At the point of alignment of hole 175b in shaft monitor gear 53b with photosensor 54f, the feedback loop can be seen to produce a logic one level at the b input terminal of NAND gate 194b which would now produce a logic zero at the input to AND gate 164m and turn off both motor 48 and counter 182. The function of latches 166e and 166f are to store a logic one level generated by decoder 184 whenever counter 182 reaches and passes the equivalent of a gear 53b position of zero or 90 degrees. This compensates for any difference in the time required for the counter and the polarizer wheel to reach the 0 or 90 degree positions.

The brightness change command from button 122a can be understood to be interpreted by CPU 71 which responds with proper changes in bit assignments of the previously discussed 7 bit control word. Thus, for example, it is readily understood that these changes would include a clockwise rotation command on control line 186 corresponding to a logic one level, a latch reset command on control line 181 which would be a momentary pulse, a logic one level switch from control line 185 to control line 183, a down count command to counter 182 over control line 189 and, a logic level one motor start command over control line 188.

Comparison of the logic architecture of both the color selection control subsystem 60 and brightness control subsystem 59 shows a high redundancy of operating components in order keep down the manufacturing costs of the overlay projector system which is one of the objects of this invention.

D. Control of Peripherals

As seen in FIG. 1, the system peripherals that communicate with Overlay Projector System 10 and touch panel assembly 22 are Underlay Slide Projector 24, Archival Disc Drive 20 and remote Lap Top or Note book Computer 26. For this embodiment, the default display of control panel 19 is divided as seen in FIG. 9A where upper margin 19a displays the pointing icon menu, right verticle margin 19b displays control function buttons and area 19c models the working area of audience display screen 28. The upper portion of column 19b is seen to contain 4 slide projector control function buttons identified by the heading SLIDE PROJECTOR 119. The lower portion of column 19b displays 9 overlay projector control function buttons identified by the heading OVERLAY PROJECTOR 120 and sub headings COLOR SELECT 120a and BRIGHTNESS 122.

Underlay Slide projector 24 is a carousel type whose rotation and slide selection is controlled from display panel 19 of FIG. 9A via buttons 119a,b,c and d. Buttons 119a and 119b provide carousel FORWARD or carousel REVERSE slide selection control while SAVE button 119c enables the lecturer to save all generated overlay graphics identified with each slide and RE- CALL button 119d enables a recall of all stored overlay graphics for multiple viewing of, for example, any given lecture. Means for this will be described below. Means for controlling forward and reverse carousel motion are provided by controlling the actuation of forward and reverse relays 73 via relay driver 72 seen in FIG. 3. Forward and Reverse selection are seen to originate as a coordinate identifying binary word following the selection and touch of buttons 119a or 119b, FIG. 9A, as discussed previously. The coordinate identification control word then follows the data bus 171b path to CPU 94. CPU 94 interprets the coordinate identifying word and converts it into a 16 bit command word which is transmitted over the RS422 communicators 92 and 70 to CPU 71 seen in FIG. 3. CPU 71 converts the 16 bit command to separate control and address words. Referring now to FIG. 5 the address word includes a register address and a slide identification component which are communicated to RAM 67 as a slide identification number. As discussed previously, for this embodiment, RAM 67 includes register space for 100 overlay graphic frames, each with an identifying address and a 2 digit hexadecimal slide identifying number. A third component of the command word goes to relay driver 72 as a forward or reverse pulse command which in turn momentarily closes the appropriate contacts of forward-/reverse relay 73 to move the slide carousel in the appropriate direction. A forward command also results in a frame transfer command from RAM 66 to RAM 67. Thus the previously projected overlay graphics are stored in appropriate registers of RAM 67 selected by the motion command word and identified with the matching underlay slide by its carousel slot number.

A similar sequence follows the reverse slide command except that the carousel motion command carries a frame transfer command of previously stored overlay graphics from the appropriate register in RAM 67 to the active frame registers of RAM 69. As described in part A of this section, the active frame register 69 dumps to display RAM 66 and refreshes it every 33 milliseconds. Also, as previously described in part A the graphics in display RAM 66 are projected on the screen by controlling LMA 32. When the lecturer completes the description of a set of slides it can be readily understood that all overlay graphics will have been shifted to the registers of RAM 67. The lecturer can now chose to permanently retain these overlay graphics as a set on floppy disc residing in Floppy Disc Drive 20. The displays for controlling archival storage and recall of sets of overlay graphics for this embodiment are shown in FIGS. 11A and B. Referring first however to FIG. 9A, the lecturer's choice to store a set of overlay graphics is made by touching SAVE button 119c. This brings up the Save screen protocols seen in FIG. 11A. This display is divided horizontally, where the lower portion is seen to contain QWERTY keyboard 135 and number pad 135a while the upper portion is seen to contain prompt menu 146a. For this mode, screen title 142, the first prompt line 137 and the page title SAVE mode 134 are initially displayed. Lines 139, 141 and 143 follow depending on the lecturers input. Screen line 137 is the first prompt requiring the entry of the lecture title. This is entered by using keyboard 135 and followed by touching ENTER button 136 as in conventional use of a computer keyboard. Screen line 139 follows and enables the lecturer to chose the slides and overlay graphics to be saved. Saving all slides stored in RAM 67 by entering Y results in confirmation screen line 141. Deletion of slides is achieved by entering N which produces screen line 143. The lecturer makes this selection with the aid of number pad 135a on screen line 143. The example shown in FIG. 11A is the deletion of slides residing in carousel 25, FIG. 1 slots 1,3 and 5. Screen line 144 displays the lecturer's final choice. Data entry to floppy disc drive 20 is now made by the touch of page EXIT button 145 which dumps all selected overlay graphics data stored in RAM 67 to the floppy disc in disc drive 20 to a disc file identified by the title entered on screen line 137 under direct control of CPU 71. The path of this control is seen in FIG. 5 and proceeds from RS 422 transceiver 70 to CPU 71. CPU 71 communicates a RAM 67 data dump command to floppy disc controller 63 over data bus lines 171a, control bus lines 172a and address bus lines 170a to disc drive interface 63 which controls data entry to floppy disc drive 20.

It is readily understood by those skilled in the art of digital systems design that the same architecture shown herein can now be used to recall all overlay graphic data stored on floppy disc in disc drive 20 and shifted one frame at a time to active frame registers 88d of RAM 88 as new data under command of slide select buttons 119a and 119b of FIG. 9A. This mode is entered with the use of recall button 133 seen in FIG. 11A. Referring now to FIG. 11B, display panel 19 shows the preferred screen organization of this embodiment when RECALL button 133 is touched. As for the SAVE mode, the initial display of RECALL menu 146b includes only screen title 148, first prompt line 149 and page title RECALL mode 133b. As seen in FIG. 11B, the RECALL screen is also divided horizontally, where the upper portion is dedicated to RECALL menu 146b and the lower portion to QWERTY display 135 and number pad display 135a. Line 150 follows the data entry to prompt line 149 by the lecturer. As for SAVE menu 146a data entry is made by the lecturer when the selected lecture name is entered and followed by touching ENTER button 136. This is seen to bring up screen 11he 150 which confirms the overlay lecture title selected for recall and the associated slide numbers. Touching EXIT button 145 completes the initialization of this mode and sets up communication between RAM 88 active registers 88d and the selected floppy disc file which carries the title entered by the lecturer. Additionally, for this embodiment, the screen of FIG. 9A is restored which enables the lecturer to control slide selection with the use of FORWARD and REVERSE buttons 119a and 119b. From this point, while in this mode, it is readily understood that the original sequence of overlay graphics will be displayed with the original sequence of slides in response to the touch of the slide control buttons. The lecturer is left to ascertain that the slides are properly ordered in the slide projector carousel 25, FIG. 1 in order to guarantee that they correspond to the order of projected overlay graphics.

Figure 4:
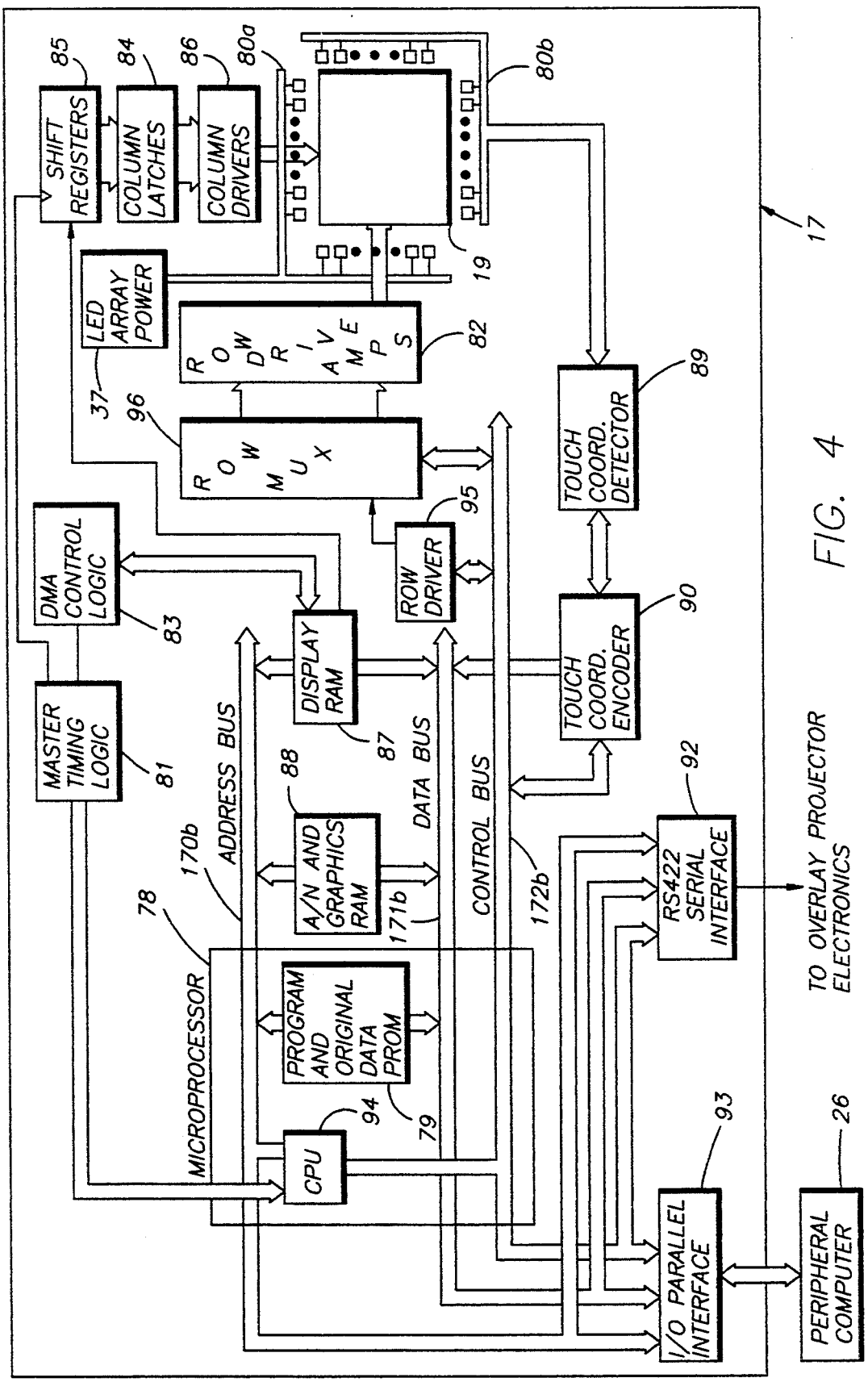
FIG. 4 is a functional description of that part of the control electronics subsystem within the remote control touchpanel enclosure.
Figure 9B:
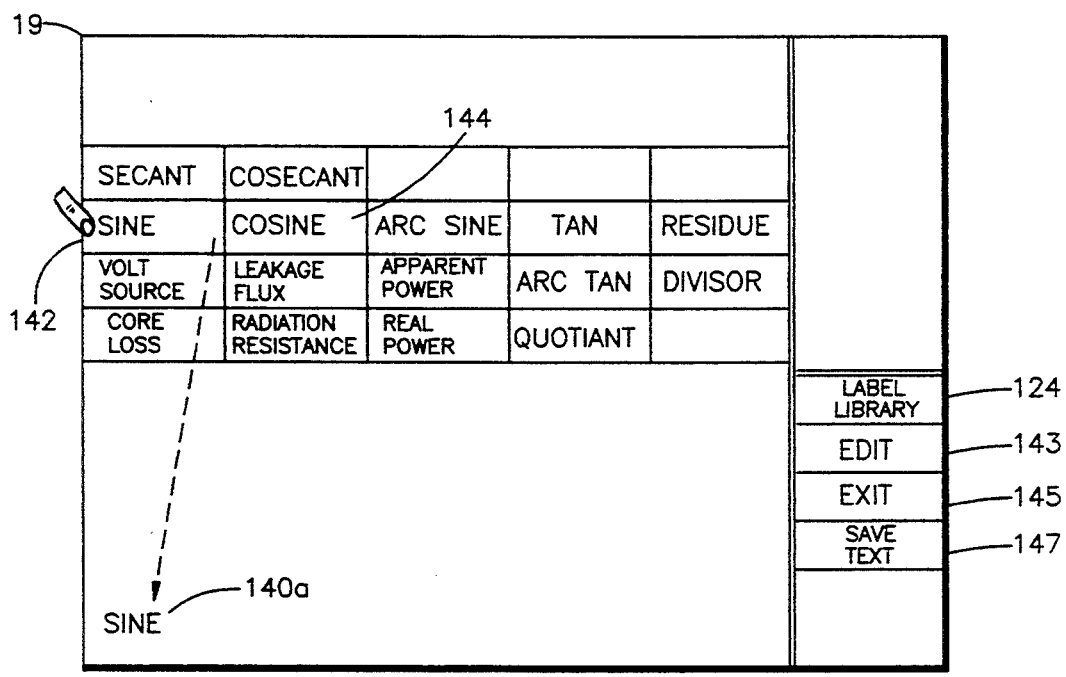
FIG. 9B shows the Label Library page offering samples of stored alpha-numeric labels plus the stored icons of the default page and other control buttons.

Refer now to FIG. 4, which describes the remote control touch panel electronics. Examination of this figure shows that the architecture for data storage and display readily enable the addition of new graphics and/or alpha-numeric labels through bus communication port 93. For this embodiment, port 93 is a parallel Input/Output interface of the IEEE 488 type that can readily transmit and receive ASCII code from external computer 26. As was discussed earlier, this feature enables the simple ad-hoc addition of alphanumeric labels which are stored in registers 88c under control of CPU 94. Those skilled in the art will understand that PROM 79 will contain an operating system that is compatible with the operating system of peripheral computer 26. Referring now to FIG. 9B which is the control panel display selected by the lecturer by touching Label Library button 124. Communications with peripheral computer 26 is then established by touching Library EDIT button 143. This selected mode establishes text addition and editing control under programs stored in PROM 79. Text added by computer 26 becomes a fixed part of the label library by touching SAVE TEXT button 147 and page EXIT button 145 which then restores the control display to that shown in FIG. 9A and disconnects computer 26.

SUMMARY OF THE DETAILED DESCRIPTION

From the above disclosure, it is evident that the method and apparatus of this invention embraces an interrelated series of devices which are advantageously employed to significantly improve the communications ability of a speaker or instructor when using visual graphic aids, such as a slide projector, to address an audience. In accordance with this invention, which is a graphic projector with the special features of simple controllability by the speaker to first adjust the brightness and color of the overlay projection to provide the optimum audience visibility against the background of the primary graphic projector and then to provide simple access to multiple graphic tools for pointing, highlighting and reidentifying the major features of the primary or underlay graphic while speaking and then, enabling the simple storage of the final complex overlay graphic for simple recall when review or repetition becomes necessary as is often the case in a one to many communicating interactive process. The apparatus of this embodiment requires no specially made complex component beyond the state of the art of modern electronic, optic and electrooptic device fabrication and indeed is seen as constructed, for the most part, of conventional solid state electronic devices and optic lenses, making it relatively simple and inexpensive to manufacture which, was one of the objects of this invention. Although the apparatus has been described in combination with a slide projector, it is readily understood that this is not a limitation of this invention and that the special features of Brightness Adjustment and Multiple Color Selection enable it to be comfortably utilized with any fixed frame graphic projector such as, for example, a Video Cassette Recorder or Motion Picture Camera with freeze frame capability. Whereas the illustrative embodiments have been described in detail herein as shown in the accompanying drawings, it is to be understood that this invention is not limited to these precise embodiments and that various changes and modifications may be effected therein without departing from the scope and spirit of this invention except as defined in the following claims.

What is claimed is:

1. An apparatus for aiding the presentation of projected, or otherwise displayed primary graphic information under discussion by a speaker or lecturer, by enabling the projection and formation of a composite of overlay graphic patterns within the boundaries of said displayed primary graphic information, said composite of overlay graphic patterns including, element forms of pointing and highlighting icons, highlighting overstrikes and alphanumeric labels, projected spatial positions of which are individually variable and the contrast of which, with respect to said displayed primary graphic information is remotely adjustable for best audience comfort by said speaker or lecturer, said apparatus comprising;
  A) An electrooptic assembly positioned for projecting said composite of overlay graphic patterns within the boundaries of said displayed primary graphic information, on an audience screen, said electrooptics assembly including;
    a) Means for projecting said composite of overlay graphic patterns including a rectangular array of solid state light modulators, each pixel or light modulating cell of which behaves as an on-off light switch thereby enabling the on-off control of a light source focused on the input side of said rectangular array of solid state light modulators and allowing the transmission of selected portions of said light source to be projected and form said composite of overlay graphic patterns;
    b) Digital electronic means including a first digital circuit means for controlling the on-off state of each of said light modulating cells of said rectangular array of solid state light modulators;
    c) A sub-assembly of projection optics comprising at least the combination of said light source generating a very high intensity white light of radiant luminous intensity greater than 20,000 candles per square centimeter, a condenser lens and a projection lens;
    d) A second digital circuit means contained within said digital electronic means controlling light polarizer means for varying the ratio of maximum to minimum or the dynamic range of projected light intensity;
    e) A third digital circuit means contained within said digital electronic means, controlling light filter means for selecting limited ranges of the spectral content of said very high intensity white light entering and leaving said solid state light modulators;
    f) Mechanical support means for containing together in proper optical alignment, said rectangular array of solid state light modulators, said very high intensity white light source, said condenser lens, said projection lens, said light polarizer means and said light filter means thereby forming a controlled light pattern projection means and enabling their operation in concert as an overlay projector;
    g) Control and timing circuitry included in said first digital circuit means controlling the on-off timing patterns of light modulating cells of said rectangular array of solid state light modulators, thereby enabling the formation and positional control of projected light patterns;
    h) A fourth digital circuit means contained within said digital electronic means including a first microprocessor with stored programs and electronic receiving means, together controlling the reception and storage of said on-off timing patterns as received in digitally encoded group forms from a remote source;
  B) An electronics assembly, remotely located with respect to said electrooptics assembly at a speakers lectern, including a control touch panel for remotely controlling said electrooptics assembly, said electronics assembly including;
    a) A fifth digital circuit means contained within said electronics assembly, said fifth digital circuit means including a second microprocessor and stored programs for controlling a display of said control touch panel, said display comprising a divided rectangular touch control display area to show at least:
      1) A first region scaled in size to said displayed primary graphic information and,
      2) A second region in the margins of said touch control display area containing displayed touch selectable modalities, icon elements or alphanumeric label choices;
    b) Stored programs contained within said second microprocessor which enable the selection and movement within said first region, by speaker touch command to said control touch panel, of said displayed icon elements and alphanumeric labels;
    c) Stored programs contained within said second microprocessor for communicating speaker touch selections to said electrooptics assembly first microprocessor for subsequent projection of the replicates of said speaker selected icons and alphanumeric labels.
  C) A multiconductor cable electrically interconnecting said electrooptics assembly with said electronics assembly.

2. The apparatus of claim 1, wherein said dynamic range of said projected composite of overlay graphic patterns is adjustable by incremental adjustments of the polarization of said high intensity light entering and leaving said rectangular array of solid state light modulators.

3. The apparatus of claim 2 wherein the boundaries between said light modulating cells which make up said rectangular array of solid state light modulators are light isolated or shielded to prevent light leakage from said light modulating cells in the on state to said light modulating cell in the off state thereby inhibiting the degradation of said dynamic range of said composite of overlay graphic patterns.

4. The apparatus of claim 3 wherein the ratio of maximum projected light intensity from a group of said light modulating cells of said rectangular array of solid state light modulators, in said on state to a group in said off state is equal to or greater than 150 to 1.

5. The apparatus of claim 4 wherein said rectangular array of solid state light modulators also has the property of good light transmittance, transmitting at least 25% of it's input light when in said on state.

6. The apparatus of claim 5 wherein all of said light modulating cells of said rectangular array of solid state light modulators also have a high cyclical switching speed requiring of the order of two microseconds or less to complete the cycle of turn on to turn off to turn on again.

7. The apparatus of claim 6 which also includes means for changing the color of said projected composite of overlay graphics by speaker touch control to said control touch panel thereby generating digital color selection commands from said second microprocessor to said third digital circuit means and thereby enabling the variation of the color of said projected composite of overlay graphics patterns and subsequently, the contrast of said projected composite of overlay graphic patterns against said displayed primary graphic patterns.

8. The apparatus of claim 7 which also includes means for changing the brightness of said projected composite of overlay graphic patterns by speaker touch control to said control touch panel, thereby generating digital brightness control commands from said second microprocessor to said second digital circuit means and thereby enabling the variation of the maximum brightness of said projected composite of overlay graphics, over a continuous range from maximum to at least one fourth of maximum brightness.

9. The apparatus of claim 8 wherein said first digital circuit means includes means to selectively address said rectangular array of solid state light modulators in a raster scan format at rates of not less than 25 frames per second and create said on-off timing patterns for each frame that are governed by an array of one bit digital words.

10. The apparatus of claim 9 wherein said one bit digital words are used to form icon and alphanumeric graphics which are positioned and oriented spatially by controlling the address logic of a digital Random Access Memory (RAM) called a Display Ram.

11. The apparatus of claim 10 wherein the content of said display RAM are updated at least 25 times per second by the information contained in a Random Access Memory (RAM) operating as a First Active Frame Register.

12. The apparatus of claim 11 wherein said fourth digital circuit means contains said First Active Frame Register and said fifth digital circuit means contains a Second Active Frame Register, wherein said First and Second Active Frame Registers communicate with each other under the control of said first and second microprocessors, to enable the selection and transfer of said graphic icons and alphanumeric labels from said control touch panel to said overlay projector.

13. The apparatus of claim 12 which contains digital word store means located within said fifth digital-circuit means, said digital word store means including a library of said alphanumeric labels and icon elements for speaker selection and programmed entry into said Second Active Frame Register and subsequent display by said overlay projector.

14. The apparatus of claim 13 which includes electronic means for selecting, by speaker touch command to said control touch panel, any of said electronically stored graphic icons to serve as pointers and highlighters and,
 a) electronic digital program means for moving, by speaker touch command, said selected pointing or highlighting icons to any position within said first region of said control touch panel display, thereby projecting the same movement by their replicates, over said primary graphics information and,
 b) electronic digital program means for freezing, by speaker touch command, said pointing or highlighting icons in any position or orientation within said first region of said touch panel display thereby freezing projected icon replicates over said primary graphic information and,
 c) electronic digital program means for recalling from electronic memory by speaker touch command, a plurality of said stored icons and, to further position and orient them and freeze their position and orientation within said first region, to thereby position, orient and freeze the positions of said projected icon replicates, over any part of said primary graphic information to serve as a plurality of pointing and highlighting icons and,
 d) electronic digital program means for deleting unwanted icons or pointers by speaker touch command and,
 e) electronic digital program means for elongating a horizontal, rectangularly shaped selected icon, by speaker touch command, to said first region of said control touch panel, thereby elongating said projected icon replicates to act as a highlighting overstrike over any portion of said primary graphic information and,
 f) electronic digital program means for selecting, positioning or orienting and freezing, by speaker touch command, the position of any of said alphanumeric labels to thereby enhance the understanding of said primary graphic information and,
 g) electronic digital program means for storing any of said, speaker selected, alphanumeric labels in digital memory spatially correlated to said primary graphic information and,
 h) digital program means for editing, by speaker touch command, any part of said plurality of projected pointing and highlighting overlay graphics such as adding or deleting said icons or said highlighting overstrikes and adding or deleting or modifying said alphanumeric labels which form said composite of overlay graphic patterns.

15. The apparatus of claim 14 wherein said rectangular icon can be positioned and elongated or shortened in stepped increments, by speaker touch command, to thereby accurately control the highlighting of selected line segments of said displayed primary graphic information.

16. The apparatus of claim 15 which includes digital electronic means within said electronic assembly for communicating with a portable data entry device such as a lap-top or note book computer.

17. The apparatus of claim 16 wherein said portable data entry device can be used to generate additional alphanumeric labels or words for entry into said second active frame register for subsequent display by said overlay projector.

18. The apparatus of claim 17 which includes a modality and digital electronic circuit means for enabling the communication or downloading of a plurality of speaker generated and projected composites of overlay graphic patterns to digital archival storage means.

19. The apparatus of claim 18 wherein said digital archival storage means is used to store said plurality of speaker generated and projected composites of overlay graphic patterns, spatially correlated with previously projected matched views of said primary graphic information.

20. The apparatus of claim 19 wherein any of said plurality of speaker generated and projected composites of overlay graphic patterns are readily recallable and can be re-projected with any of said matched views of previously projected primary graphic information.

* * * * *